United States Patent
Dunn

(10) Patent No.: US 12,165,489 B2
(45) Date of Patent: Dec. 10, 2024

(54) DISPLAY ASSEMBLIES PROVIDING OPEN AND UNLATCHED ALERTS, SYSTEMS AND METHODS FOR THE SAME

(71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 18/620,684

(22) Filed: Mar. 28, 2024

(65) Prior Publication Data

US 2024/0242590 A1 Jul. 18, 2024

Related U.S. Application Data

(63) Continuation of application No. 18/096,596, filed on Jan. 13, 2023, now Pat. No. 11,972,672, which is a
(Continued)

(51) Int. Cl.
| | |
|---|---|
| *G08B 21/18* | (2006.01) |
| *G01D 5/14* | (2006.01) |
| *G09F 9/35* | (2006.01) |

(52) U.S. Cl.
CPC ............ *G08B 21/18* (2013.01); *G01D 5/14* (2013.01); *G09F 9/35* (2013.01)

(58) Field of Classification Search
CPC ............ G08B 21/18; G01D 5/14; G09F 9/35
(Continued)

(56) References Cited

U.S. PATENT DOCUMENTS

| | | |
|---|---|---|
| 3,504,528 A | 4/1970 | Weinberg et al. |
| 3,807,220 A | 4/1974 | Ottenstein et al. |
| | (Continued) | |

FOREIGN PATENT DOCUMENTS

| | | |
|---|---|---|
| AU | 2016321400 B2 | 9/2019 |
| CN | 203277867 U | 11/2013 |
| | (Continued) | |

OTHER PUBLICATIONS

Photo Research, Inc., PR®-650 SpectraScan® Colorimeter, 1999, 2 pages.
Texas Advanced Optoelectronic Solutions Inc., TCS230 Programmable Color Light-To-Frequency Converter, Dec. 2007, 12 pages.
Methven, Don, Wireless Video Streaming: An Overview, Nov. 16, 2022, 7 pages.

(Continued)

*Primary Examiner* — Mark Edwards
(74) *Attorney, Agent, or Firm* — Standley Law Group LLP; Jeffrey S. Standley; Adam J. Smith

(57) ABSTRACT

Display assemblies and related systems and methods are disclosed which alert to unsecured conditions. An electronic display is movable attached to a structural subassembly, and a securing device moves between a secured configuration securing the electronic display to the structural framework in a closed position and an unsecured configuration allowing movement of the electronic display into an opened position away, at least in part, from the structural subassembly. One or more sensors detect if the display assembly is secured such that the electronic display is in the closed position and the securing device is in the secured configuration, or not. A controller receives data from the sensors, permits the electronic display to undertake normal operations where the data indicates that the display assembly is secured, and, at each discrete instance where the data indicates that said display assembly is not secured, generate an alert message.

20 Claims, 19 Drawing Sheets

Related U.S. Application Data continuation-in-part of application No. 17/974,309, filed on Oct. 26, 2022, now Pat. No. 11,803,344.

(58) Field of Classification Search
USPC .......................................................... 345/2.1
See application file for complete search history.

(56) References Cited

U.S. PATENT DOCUMENTS

| | | |
|---|---|---|
| 4,527,804 A | 7/1985 | Spencer |
| 5,162,785 A | 11/1992 | Fagard |
| 5,168,961 A | 12/1992 | Schneider |
| 5,228,339 A | 7/1993 | Maresca, Jr. et al. |
| 5,322,051 A | 6/1994 | Patterson et al. |
| 5,351,201 A | 9/1994 | Harshbarger, Jr. et al. |
| 5,590,831 A | 1/1997 | Manson et al. |
| 5,751,346 A | 5/1998 | Dozier et al. |
| 5,786,801 A | 7/1998 | Ichise |
| 5,952,992 A | 9/1999 | Helms |
| 6,042,443 A | 3/2000 | Carella et al. |
| 6,144,359 A | 11/2000 | Grave |
| 6,157,143 A | 12/2000 | Bigio et al. |
| 6,158,692 A | 12/2000 | Abild et al. |
| 6,215,411 B1 | 4/2001 | Gothard |
| 6,222,841 B1 | 4/2001 | Taniguchi |
| 6,259,492 B1 | 7/2001 | Imoto et al. |
| 6,374,187 B1 | 4/2002 | Knight et al. |
| 6,384,736 B1 | 5/2002 | Gothard |
| 6,421,694 B1 | 7/2002 | Nawaz et al. |
| 6,509,911 B1 | 1/2003 | Shimotono |
| 6,526,807 B1 | 3/2003 | Doumit et al. |
| 6,546,294 B1 | 4/2003 | Kelsey et al. |
| 6,553,336 B1 | 4/2003 | Johnson et al. |
| 6,556,258 B1 | 4/2003 | Yoshida et al. |
| 6,587,525 B2 | 7/2003 | Jeong et al. |
| 6,701,143 B1 | 3/2004 | Dukach et al. |
| 6,753,842 B1 | 6/2004 | Williams et al. |
| 6,771,795 B1 | 8/2004 | Isnardi |
| 6,812,851 B1 | 11/2004 | Dukach et al. |
| 6,821,179 B2 | 11/2004 | Ando |
| 6,850,209 B2 | 2/2005 | Mankins et al. |
| 6,955,170 B1 | 10/2005 | Mullins et al. |
| 6,968,375 B1 | 11/2005 | Brown |
| 7,007,545 B1 | 3/2006 | Martinek |
| 7,038,186 B2 | 5/2006 | De Brabander et al. |
| 7,064,672 B2 | 6/2006 | Gothard |
| 7,319,862 B1 | 1/2008 | Lincoln et al. |
| 7,330,002 B2 | 2/2008 | Joung |
| 7,369,058 B2 | 5/2008 | Gothard |
| 7,380,265 B2 | 5/2008 | Jensen et al. |
| 7,391,317 B2 | 6/2008 | Abraham et al. |
| 7,451,332 B2 | 11/2008 | Culbert et al. |
| 7,474,294 B2 | 1/2009 | Leo et al. |
| 7,516,223 B2 | 4/2009 | Whitehead |
| 7,577,458 B2 | 8/2009 | Lin |
| 7,581,094 B1 | 8/2009 | Apostolopoulos et al. |
| 7,595,785 B2 | 9/2009 | Jang |
| 7,612,278 B2 | 11/2009 | Sitrick et al. |
| 7,614,065 B2 | 11/2009 | Weissmueller, Jr. et al. |
| 7,636,927 B2 | 12/2009 | Zigmond et al. |
| 7,658,787 B2 | 2/2010 | Morse et al. |
| 7,675,862 B2 | 3/2010 | Pham et al. |
| 7,679,279 B2 | 3/2010 | Kamio et al. |
| 7,751,813 B2 | 7/2010 | Varanda |
| 7,764,280 B2 | 7/2010 | Shiina |
| 7,774,633 B1 | 8/2010 | Harrenstien et al. |
| 7,795,821 B2 | 9/2010 | Jun |
| 7,882,728 B2 | 2/2011 | Kizaki et al. |
| 7,889,852 B2 | 2/2011 | Whitehead |
| 7,949,893 B1 | 5/2011 | Knaus et al. |
| 8,074,627 B2 | 12/2011 | Siddiqui et al. |
| 8,212,921 B2 | 7/2012 | Yun |
| 8,218,812 B2 | 7/2012 | Sugimoto et al. |
| 8,248,203 B2 | 8/2012 | Hanwright et al. |
| 8,336,369 B2 | 12/2012 | Mahoney |
| 8,441,574 B2 | 5/2013 | Dunn et al. |
| 8,483,554 B2 | 7/2013 | Takimoto et al. |
| 8,601,252 B2 | 12/2013 | Mendelow et al. |
| 8,612,608 B2 | 12/2013 | Whitehead |
| 8,654,302 B2 | 2/2014 | Dunn et al. |
| 8,689,343 B2 | 4/2014 | De Laet |
| 8,767,165 B2 | 7/2014 | Dunn |
| 8,854,595 B2 | 10/2014 | Dunn |
| 8,881,576 B2 | 11/2014 | Schwartz et al. |
| 8,983,385 B2 | 3/2015 | Macholz |
| 9,026,686 B2 | 5/2015 | Dunn et al. |
| 9,147,194 B1 | 9/2015 | Le et al. |
| 9,363,262 B1 | 6/2016 | Wilkes |
| 9,760,151 B1 | 9/2017 | Hou |
| 9,812,047 B2 | 11/2017 | Schuch et al. |
| 10,120,498 B2 | 11/2018 | Gray |
| 10,170,076 B2 | 1/2019 | Wang et al. |
| 10,174,519 B1 | 1/2019 | Carpenter et al. |
| 10,296,108 B2 | 5/2019 | Gray et al. |
| 10,311,763 B2 | 6/2019 | Greenfield |
| 10,325,536 B2 | 6/2019 | Schuch et al. |
| 10,353,785 B2 | 7/2019 | Dunn et al. |
| 10,578,658 B2 | 3/2020 | Dunn et al. |
| 10,593,175 B1 | 3/2020 | Jennings et al. |
| 10,706,752 B2 | 7/2020 | Greenfield |
| 10,908,863 B2 | 2/2021 | Newnham et al. |
| 11,093,355 B2 | 8/2021 | Dunn et al. |
| 11,131,453 B2 | 9/2021 | Kim et al. |
| 11,137,847 B2 | 10/2021 | Dunn |
| 11,243,733 B2 | 2/2022 | Newnham et al. |
| 11,402,940 B2 | 8/2022 | Dunn |
| 11,455,138 B2 | 9/2022 | Newnham et al. |
| 11,614,911 B2 | 3/2023 | Newnham et al. |
| 11,644,921 B2 | 5/2023 | Dunn |
| 11,645,029 B2 | 5/2023 | Newnham et al. |
| 11,803,344 B2 | 10/2023 | Newnham et al. |
| 11,921,010 B2 | 3/2024 | Dunn et al. |
| 11,928,380 B2 | 3/2024 | Newnham et al. |
| 2002/0019933 A1 | 2/2002 | Friedman et al. |
| 2002/0026354 A1 | 2/2002 | Shoji et al. |
| 2002/0065046 A1 | 5/2002 | Mankins et al. |
| 2002/0112026 A1 | 8/2002 | Fridman et al. |
| 2002/0120721 A1 | 8/2002 | Eilers et al. |
| 2002/0147648 A1 | 10/2002 | Fadden et al. |
| 2002/0152425 A1 | 10/2002 | Chaiken et al. |
| 2002/0163513 A1 | 11/2002 | Tsuji |
| 2002/0163916 A1 | 11/2002 | Oskouy et al. |
| 2002/0164962 A1 | 11/2002 | Mankins et al. |
| 2002/0190972 A1 | 12/2002 | Ven de Van |
| 2002/0194365 A1 | 12/2002 | Jammes |
| 2002/0194609 A1 | 12/2002 | Tran |
| 2003/0031128 A1 | 2/2003 | Kim et al. |
| 2003/0039312 A1 | 2/2003 | Horowitz et al. |
| 2003/0061316 A1 | 3/2003 | Blair et al. |
| 2003/0097497 A1 | 5/2003 | Esakov |
| 2003/0098881 A1 | 5/2003 | Nolte et al. |
| 2003/0115591 A1 | 6/2003 | Weissmueller, Jr. et al. |
| 2003/0117714 A1 | 6/2003 | Nakamura et al. |
| 2003/0132514 A1 | 7/2003 | Liebeskind |
| 2003/0161354 A1 | 8/2003 | Bader et al. |
| 2003/0177269 A1 | 9/2003 | Robinson et al. |
| 2003/0192060 A1 | 10/2003 | Levy |
| 2003/0196208 A1 | 10/2003 | Jacobson |
| 2003/0214242 A1 | 11/2003 | Berg-johansen |
| 2003/0230991 A1 | 12/2003 | Muthu et al. |
| 2004/0036697 A1 | 2/2004 | Kim et al. |
| 2004/0138840 A1 | 7/2004 | Wolfe |
| 2004/0158872 A1 | 8/2004 | Kobayashi |
| 2004/0194131 A1 | 9/2004 | Ellis et al. |
| 2004/0243940 A1 | 12/2004 | Lee et al. |
| 2004/0252400 A1 | 12/2004 | Blank et al. |
| 2004/0253947 A1 | 12/2004 | Phillips et al. |
| 2005/0033840 A1 | 2/2005 | Nisani et al. |
| 2005/0070335 A1 | 3/2005 | Jitsuishi et al. |
| 2005/0071252 A1 | 3/2005 | Henning et al. |
| 2005/0073518 A1 | 4/2005 | Bontempi |
| 2005/0088984 A1 | 4/2005 | Chin et al. |
| 2005/0123001 A1 | 6/2005 | Craven et al. |
| 2005/0132036 A1 | 6/2005 | Jang et al. |

(56) References Cited

U.S. PATENT DOCUMENTS

| | | |
|---|---|---|
| 2005/0179554 A1 | 8/2005 | Lu |
| 2005/0184983 A1 | 8/2005 | Brabander et al. |
| 2005/0216939 A1 | 9/2005 | Corbin |
| 2005/0231457 A1 | 10/2005 | Yamamoto et al. |
| 2005/0267943 A1 | 12/2005 | Castaldi et al. |
| 2005/0289061 A1 | 12/2005 | Kulakowski et al. |
| 2005/0289588 A1 | 12/2005 | Kinnear |
| 2006/0007107 A1 | 1/2006 | Ferguson |
| 2006/0022616 A1 | 2/2006 | Furukawa et al. |
| 2006/0150222 A1 | 7/2006 | McCafferty et al. |
| 2006/0160614 A1 | 7/2006 | Walker et al. |
| 2006/0269216 A1 | 11/2006 | Wiemeyer et al. |
| 2007/0039028 A1 | 2/2007 | Bar |
| 2007/0154060 A1 | 7/2007 | Sun |
| 2007/0157260 A1 | 7/2007 | Walker |
| 2007/0168539 A1 | 7/2007 | Day |
| 2007/0200513 A1 | 8/2007 | Ha et al. |
| 2007/0214812 A1 | 9/2007 | Wagner et al. |
| 2007/0237636 A1 | 10/2007 | Hsu |
| 2007/0268241 A1 | 11/2007 | Nitta et al. |
| 2007/0273519 A1 | 11/2007 | Ichikawa et al. |
| 2007/0274400 A1 | 11/2007 | Murai et al. |
| 2007/0286107 A1 | 12/2007 | Singh et al. |
| 2007/0291198 A1 | 12/2007 | Shen |
| 2008/0008471 A1 | 1/2008 | Dress |
| 2008/0019147 A1 | 1/2008 | Erchak et al. |
| 2008/0024268 A1 | 1/2008 | Wong et al. |
| 2008/0034205 A1 | 2/2008 | Alain et al. |
| 2008/0037466 A1 | 2/2008 | Ngo et al. |
| 2008/0037783 A1 | 2/2008 | Kim et al. |
| 2008/0055297 A1 | 3/2008 | Park |
| 2008/0096559 A1 | 4/2008 | Phillips et al. |
| 2008/0104631 A1 | 5/2008 | Krock et al. |
| 2008/0111958 A1 | 5/2008 | Kleverman et al. |
| 2008/0112601 A1 | 5/2008 | Warp |
| 2008/0136770 A1 | 6/2008 | Peker et al. |
| 2008/0163291 A1 | 7/2008 | Fishman et al. |
| 2008/0185976 A1 | 8/2008 | Dickey et al. |
| 2008/0218501 A1 | 9/2008 | Diamond |
| 2008/0246871 A1 | 10/2008 | Kupper et al. |
| 2008/0266554 A1 | 10/2008 | Sekine et al. |
| 2008/0267328 A1 | 10/2008 | Ianni et al. |
| 2008/0278099 A1 | 11/2008 | Bergfors et al. |
| 2008/0281165 A1 | 11/2008 | Rai et al. |
| 2008/0303918 A1 | 12/2008 | Keithley |
| 2008/0313691 A1 | 12/2008 | Cholas et al. |
| 2009/0009997 A1 | 1/2009 | Sanfilippo et al. |
| 2009/0015400 A1 | 1/2009 | Breed |
| 2009/0034283 A1* | 2/2009 | Albright ............... F21V 29/74 362/545 |
| 2009/0036190 A1 | 2/2009 | Brosnan et al. |
| 2009/0079416 A1 | 3/2009 | Vinden et al. |
| 2009/0104989 A1 | 4/2009 | Williams et al. |
| 2009/0129556 A1 | 5/2009 | Ahn |
| 2009/0140858 A1* | 6/2009 | Gore ..................... G08B 29/046 340/547 |
| 2009/0152445 A1 | 6/2009 | Gardner, Jr. |
| 2009/0164615 A1 | 6/2009 | Akkanen |
| 2009/0273568 A1 | 11/2009 | Milner |
| 2009/0315867 A1 | 12/2009 | Sakamoto et al. |
| 2010/0017526 A1 | 1/2010 | Jagannath et al. |
| 2010/0037274 A1 | 2/2010 | Meuninck et al. |
| 2010/0060550 A1 | 3/2010 | McGinn et al. |
| 2010/0083305 A1 | 4/2010 | Acharya et al. |
| 2010/0149567 A1 | 6/2010 | Kanazawa et al. |
| 2010/0177157 A1 | 7/2010 | Stephens et al. |
| 2010/0177158 A1 | 7/2010 | Walter |
| 2010/0177750 A1 | 7/2010 | Essinger et al. |
| 2010/0198983 A1 | 8/2010 | Monroe et al. |
| 2010/0226091 A1 | 9/2010 | Dunn |
| 2010/0231563 A1 | 9/2010 | Dunn et al. |
| 2010/0237697 A1 | 9/2010 | Dunn et al. |
| 2010/0238299 A1 | 9/2010 | Dunn et al. |
| 2010/0299556 A1 | 11/2010 | Taylor et al. |
| 2011/0019636 A1 | 1/2011 | Fukuoka et al. |
| 2011/0047567 A1 | 2/2011 | Zigmond et al. |
| 2011/0078536 A1 | 3/2011 | Han et al. |
| 2011/0283199 A1 | 11/2011 | Schuch et al. |
| 2012/0105424 A1 | 5/2012 | Lee et al. |
| 2012/0203872 A1 | 8/2012 | Luby et al. |
| 2012/0302343 A1 | 11/2012 | Hurst et al. |
| 2012/0308191 A1 | 12/2012 | Chung et al. |
| 2013/0007110 A1 | 1/2013 | Centner |
| 2013/0162908 A1 | 6/2013 | Son et al. |
| 2013/0173358 A1 | 7/2013 | Pinkus |
| 2013/0282154 A1 | 10/2013 | Chappell et al. |
| 2014/0002747 A1 | 1/2014 | Macholz |
| 2014/0009893 A1 | 1/2014 | Lai |
| 2014/0172174 A1 | 6/2014 | Poss et al. |
| 2014/0230526 A1 | 8/2014 | Willemin et al. |
| 2015/0169827 A1 | 6/2015 | LaBorde |
| 2015/0193074 A1 | 7/2015 | Cudak et al. |
| 2015/0250021 A1 | 9/2015 | Stice et al. |
| 2016/0034240 A1 | 2/2016 | Kreiner et al. |
| 2016/0112521 A1 | 4/2016 | Lawson et al. |
| 2016/0125772 A1 | 5/2016 | Li et al. |
| 2016/0292744 A1 | 10/2016 | Strimaitis et al. |
| 2017/0075777 A1 | 3/2017 | Dunn et al. |
| 2017/0083043 A1 | 3/2017 | Bowers et al. |
| 2017/0163519 A1* | 6/2017 | Bowers ................. H04L 43/50 |
| 2017/0242502 A1 | 8/2017 | Gray et al. |
| 2017/0242534 A1 | 8/2017 | Gray |
| 2017/0256051 A1 | 9/2017 | Dwivedi et al. |
| 2017/0315886 A1 | 11/2017 | Helmick et al. |
| 2018/0027635 A1 | 1/2018 | Roquemore, III |
| 2018/0061297 A1 | 3/2018 | Schuch et al. |
| 2018/0089717 A1 | 3/2018 | Morin et al. |
| 2018/0128708 A1 | 5/2018 | Cirino |
| 2018/0181091 A1 | 6/2018 | Funk et al. |
| 2018/0268783 A1 | 9/2018 | Woo |
| 2018/0284758 A1 | 10/2018 | Cella et al. |
| 2018/0314103 A1 | 11/2018 | Dunn et al. |
| 2018/0364858 A1 | 12/2018 | Gray |
| 2018/0364859 A1 | 12/2018 | Gray |
| 2018/0364860 A1 | 12/2018 | Gray |
| 2018/0364861 A1 | 12/2018 | Gray |
| 2019/0087042 A1 | 3/2019 | Van Ostrand et al. |
| 2019/0096202 A1 | 3/2019 | Seelman |
| 2019/0171331 A1 | 6/2019 | Gray et al. |
| 2019/0258552 A1 | 8/2019 | Dunn et al. |
| 2019/0367148 A1* | 12/2019 | Kehlenbeck ........... G07C 5/008 |
| 2020/0012383 A1 | 1/2020 | Wang et al. |
| 2020/0019363 A1 | 1/2020 | Newnham et al. |
| 2020/0272269 A1 | 8/2020 | Dunn |
| 2021/0117143 A1 | 4/2021 | Newnham et al. |
| 2021/0174715 A1 | 6/2021 | Holloway et al. |
| 2021/0397292 A1 | 12/2021 | Dunn |
| 2022/0100452 A1 | 3/2022 | Newnham et al. |
| 2022/0260872 A1 | 8/2022 | Dunn et al. |
| 2022/0317801 A1 | 10/2022 | Dunn |
| 2022/0413786 A1 | 12/2022 | Newnham et al. |
| 2023/0029615 A1 | 2/2023 | Dunn et al. |
| 2023/0048815 A1 | 2/2023 | Newnham et al. |
| 2023/0052966 A1 | 2/2023 | Newnham et al. |
| 2023/0160774 A1 | 5/2023 | Dunn et al. |
| 2023/0195399 A1 | 6/2023 | Newnham et al. |
| 2023/0229253 A1 | 7/2023 | Dunn |
| 2023/0229373 A1 | 7/2023 | Newnham et al. |

FOREIGN PATENT DOCUMENTS

| | | |
|---|---|---|
| CN | 217384567 U | 9/2022 |
| EP | 0313331 B1 | 2/1994 |
| EP | 1821538 A1 | 8/2007 |
| EP | 2351369 A2 | 8/2011 |
| EP | 2396964 A2 | 12/2011 |
| EP | 3347793 A1 | 7/2018 |
| JP | 61-234690 A | 10/1986 |
| JP | 61-251901 A | 11/1986 |
| JP | 7-74224 A | 3/1995 |
| JP | 2000122575 A | 4/2000 |
| JP | 3080628 B2 | 8/2000 |
| JP | 2002064842 A | 2/2002 |
| JP | 2002209230 A | 7/2002 |

(56) References Cited

FOREIGN PATENT DOCUMENTS

| | | | |
|---|---|---|---|
| JP | 2005-211449 A | 8/2005 |
| JP | 2005-211451 A | 8/2005 |
| JP | 2005236469 A | 9/2005 |
| JP | 2005333568 A | 12/2005 |
| JP | 4235429 B2 | 3/2009 |
| JP | 2010282109 A | 12/2010 |
| JP | 2018537876 A | 12/2018 |
| JP | 6639653 B2 | 1/2020 |
| KR | 200361111 Y1 | 9/2004 |
| KR | 10-2010-0081354 A | 7/2010 |
| KR | 10-2011-0065338 A | 6/2011 |
| KR | 10-2056069 B1 | 12/2019 |
| WO | WO9608892 A1 | 3/1996 |
| WO | WO2008050402 A1 | 5/2008 |
| WO | WO2011106683 A2 | 9/2011 |
| WO | WO2012/127971 A1 | 9/2012 |
| WO | WO2013/182733 A1 | 12/2013 |
| WO | WO2017044952 A1 | 3/2017 |
| WO | WO2020/176416 A1 | 9/2020 |
| WO | WO2023/009477 A1 | 2/2023 |

OTHER PUBLICATIONS

Outdoorlink, Inc., SmartLink One, One Relay, http://smartlinkcontrol.com/billboard/one-relay/, retrieved Apr. 17, 2019, 2007-16, 6 pages.

Outdoorlink, Inc., SmartLink Website User Manual, http://smartlink.outdoorlinkinc.com/docs/SmartLinkWebsiteUserManual.pdf, 2017, 33 pages.

Outdoorlink, Inc., SmartLink One Out of Home Media Controller, 2016, 1 page.

Sigmasense, Analog can't touch Digital, https://sigmasense.com/, retrieved Jan. 23, 2019, 5 pages.

Sigmasense, Solutions, https://sigmasense.com/solutions/, retrieved Jan. 23, 2019, 4 pages.

Sigmasense, Technology, https://sigmasense.com/technology/, retrieved Jan. 23, 2019, 3 pages.

Turley, Jim, SigmaSence ICCI Goes Big, New Touch Technology Aimed at Big Screens, But That's Just for Starters, EEJournal, https://www.eejournal.com/article/sigmasense-icci-goes-big/, Jan. 8, 2019, 3 pages.

* cited by examiner

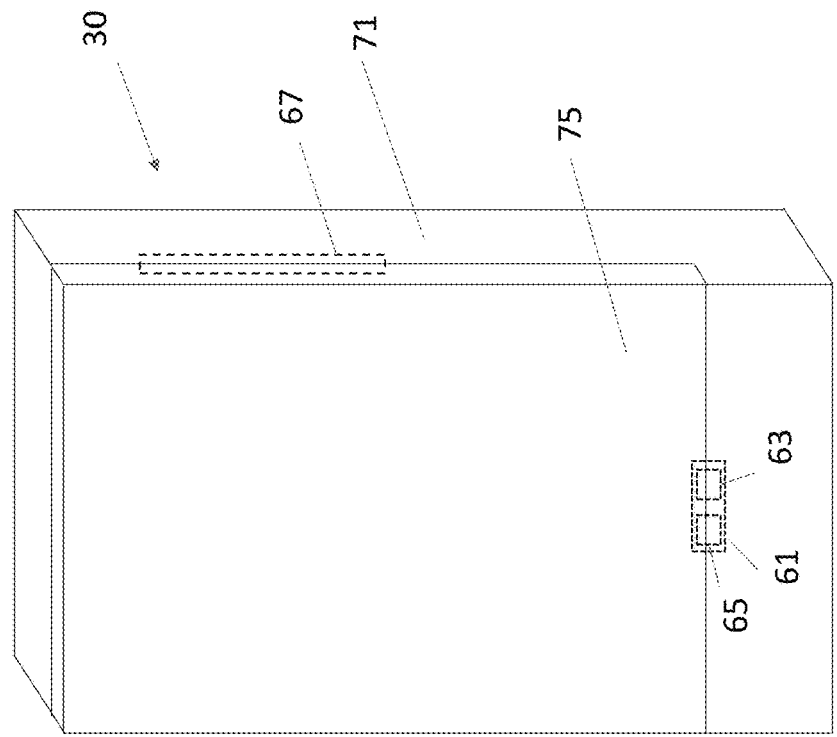
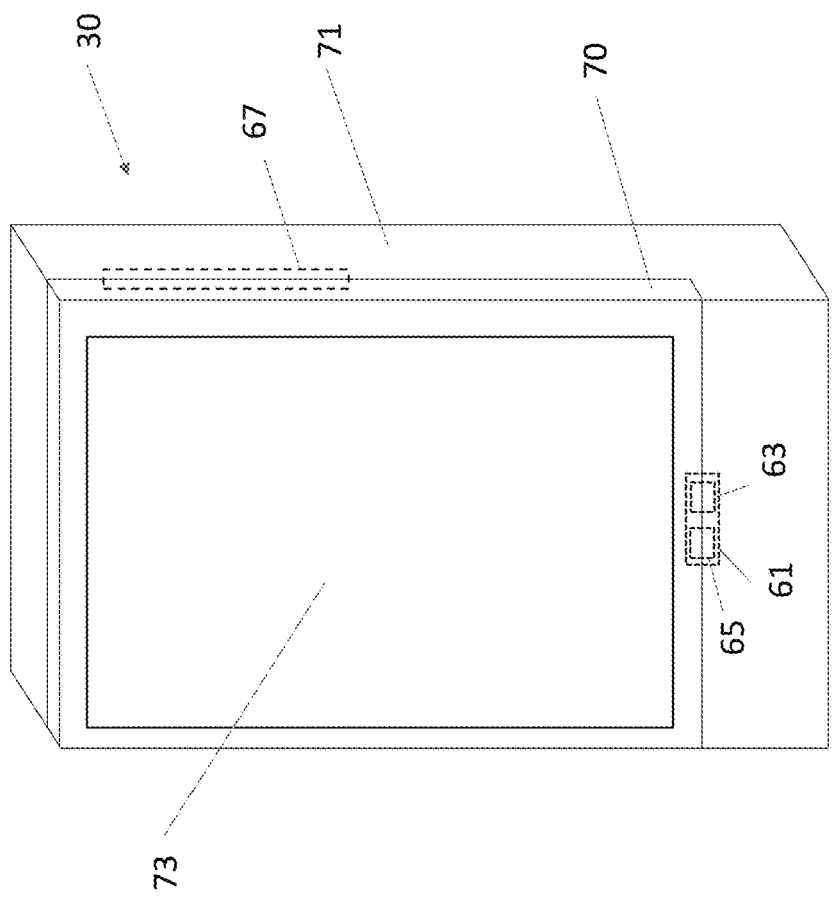

Figure 17

DISPLAY ASSEMBLIES PROVIDING OPEN AND UNLATCHED ALERTS, SYSTEMS AND METHODS FOR THE SAME

CROSS-REFERENCE TO RELATED APPLICATION

This application is a continuation of U.S. application Ser. No. 18/096,596 filed Jan. 13, 2023, which is a continuation-in-part of U.S. application Ser. No. 17/974,309 filed Oct. 26, 2022, the disclosure of which is hereby incorporated by reference as if fully restated herein.

TECHNICAL FIELD

Exemplary embodiments relate generally to display assemblies which provide alerts when opened or unlatched, as well as systems and methods for the same.

BACKGROUND AND SUMMARY OF THE INVENTION

The use of electronic displays has increased in recent years. Beyond personal use, these electronic displays are sometimes placed in an enclosure, which may be ruggedized, for both indoor and/or outdoor use. For example, without limitation, such display assemblies may be placed outdoors, such as on sidewalks or on the tops of vehicles to name some examples, to display advertisements or other information. Oftentimes these display assemblies are associated with other electronic equipment to provide features such as, but not limited to, video conferencing, web browsing, way finding, image capture, emergency notification, and the like. It is desirable to provide owners, manufactures, operators, renters, or the like of such display assemblies with access to operations data regarding the status and operation of such display assemblies. Furthermore, these display assemblies consume a significant amount of power during operation. A significant amount of the energy consumption of such display assemblies comes from operation of the backlight. Particularly as the use of such display assemblies has increased, it is desirable that such operations data include data regarding the energy consumption of the display, including but not limited to, status and operation of the backlight. Such operations data may be stored and presented to display owners and other relevant parties such that energy consumption and reliability may be tracked. Certain operations parameters may be adjusted in response to the presented data. For example, without limitation, backlight levels may be adjusted downward to reduce energy consumption or maintenance frequencies may be increased in response to reported display assembly downtime.

However, for many such display assemblies, multiple parties may have an interest in the operations data. For example, a display assembly manufacturer may have an interest in monitoring its tens, hundreds, thousands, tens of thousands, etc. of display assemblies. Each owner or renter of one or more such display assemblies might likewise have an interest in monitoring the display assemblies it owns. While the manufacturer may already have access to this operations data, the operations data may include data for all owners or renters. Thus, the operations data may be co-located with operations data for other owners or renters. Allowing complete access to such data may create privacy concerns. However, individual storage of each client's information would potentially require multiple storage devices, increasing complexity and expense. Therefore, what is needed is a system and method for providing access to co-located operations data for a display assembly.

The present disclosures provide a system and method for providing access to co-located operations data for a display assembly. The system may comprise one or more client devices in communication with a centralized monitoring center via a network. Multiple display assemblies may likewise be in communication with the monitoring center via the network. In exemplary embodiments, each display assembly comprises one or more electronic displays and other electronic components for operation of the display assembly in electrical connection with a display controller. The display controller may likewise be in electrical connection with a network interface device. The network interface device may likewise be in communication with the centralized monitoring center via the network.

Operations data may be continually gathered and transmitted to the central monitoring center for storage. The received operations data may be processed. Such processing may determine which client(s) are associated with the operations data and what the operations data represents. The operations data may be summarized and presented in a visual depiction. Upon receipt of a client request for operations information, client specific information may be retrieved and presented to the client in the visual depiction. In other exemplary embodiments, upon login, a client may be permitted to remotely operate or modify display assemblies associated with the client.

Remote monitoring and/or operation of display assemblies may permit display owners, operators, users, or the like to monitor display assembly status and/or exert operational control over the same from various locations. In exemplary embodiments, without limitation, some or all of the display assemblies may include latches, locking devices, and/or switches which are remotely monitorable and/or operable, such as to monitor whether portions of the display assemblies, such as but not limited to access panels and/or electronic displays, are in an opened and/or closed position, locked and/or unlocked positions, and/or permit remote locking and/or unlocking of the same and/or movement between the opened and/or closed positions. Such switches may include micro-switches, though such is not necessarily required.

Various data points may be remotely monitored and/or adjusted. Such data points may include, for example without limitation, sensor information, settings, operational parameters, user preferences, operation information, status information, combinations thereof, or the like. Any number and/or type of data points may be monitored and/or adjusted such as but not limited to, day brightness level, night brightness level, brightness transition day-night-day, autonomous peripheral power cycling under what conditions, autonomous media player reboots under what conditions, combinations thereof, or the like.

For example, without limitation, such data points may include whether each electronic display and/or latching and/or locking device for the same is in the opened and/or closed position, locked and/or unlocked positions, such as but not limited to, based on data received from the latches, locking devices, and/or switches.

Alternatively, or additionally, such data points may include power limits. These may include, by way of non-limiting example, AC power input limits. For example, without limitation, a maximum power input setting may be adjusted or set to a level below a trip limit of one or more circuit breakers for the display assembly. The circuit breakers may be integrated with the display assembly, external thereto, or otherwise. The controller may be configured to monitor power consumption, and where the power consumption approaches, reaches, or exceeds the maximum power input setting, the controller may be configured to automatically adjust display assembly operations, such as to reduce power consumption. For example, without limitation, luminance settings may be decreased, fan speed may be decreased, combinations thereof, or the like. This may assist with preventing or limiting nuisance trips of power breakers.

The various data points may be remotely monitored and/or updated. The data points may be filtered, such as for viewing or updating, based on various display assembly characteristics, user preferences, type or kind of data point, time associated with data point, combinations thereof, or the like. The display assembly characteristics may include, but are not necessarily limited to, deployed geographic region (e.g., zip code, city, within distance from particular location, state, province, country, address, navigational coordinates, combinations thereof, or the like), part number, unit serial number, fleet identifier, customer identifier, advertisement identifier, combinations thereof, or the like.

Display assemblies need maintained or inspected from time-to-time. Maintenance efforts may require opening one or more of the electronic displays, or assemblies thereof, and/or access panels such as to access an interior of the unit. Sometimes, this also includes unlatching or unlocking the electronic displays, or assemblies thereof, and/or access panels. The term "side assembly" may be used herein in at least some instances to refer to any individual one of the electronic displays, or assemblies thereof, and/or access panels. In the plural form, the term "side assemblies" may collectively refer to multiple electronic displays 70, or assemblies thereof, multiple access panels 75, or some combination thereof. Upon completion or such maintenance efforts, the side assemblies should be securely closed. However, this does not always happen for a number of reasons, including forgetfulness or difficulty latching.

Systems and methods provided herein include remote monitoring of display assemblies and side assemblies thereof. Mechanisms may be provided for electronically monitoring whether a side assembly is latched and/or closed. Such mechanisms may include, for example without limitation, switches and/or proximity sensor. Side assembly status may be locally and/or remotely monitored, conditions reported, and/or alerts may be generated when a side assembly is indicated as being open or unlatched for at least a predetermined period of time, such as detected by the mechanism(s). In exemplary embodiments, without limitation, a controller may be configured to automatically interrupt normal display functions with a message regarding the display status when a side assembly is open or unlatched, such as an indicator that the display is open or unlatched and which side is opened or unlatched. The controller may be configured to resume normal image operations when the side assembly is shut and latched properly, such as detected by the mechanism(s). This may provide an indication that the side is closed and latched.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 12A is a front perspective view of another exemplary display assembly for use with the system of at least FIG. 1;
FIG. 12B is a rear perspective view of another exemplary display assembly for use with the system of at least FIG. 1;
FIG. 17 is a plan view of an exemplary report generatable by at least the system of FIGS. 1 and 12A-12B and the method of FIG. 15.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
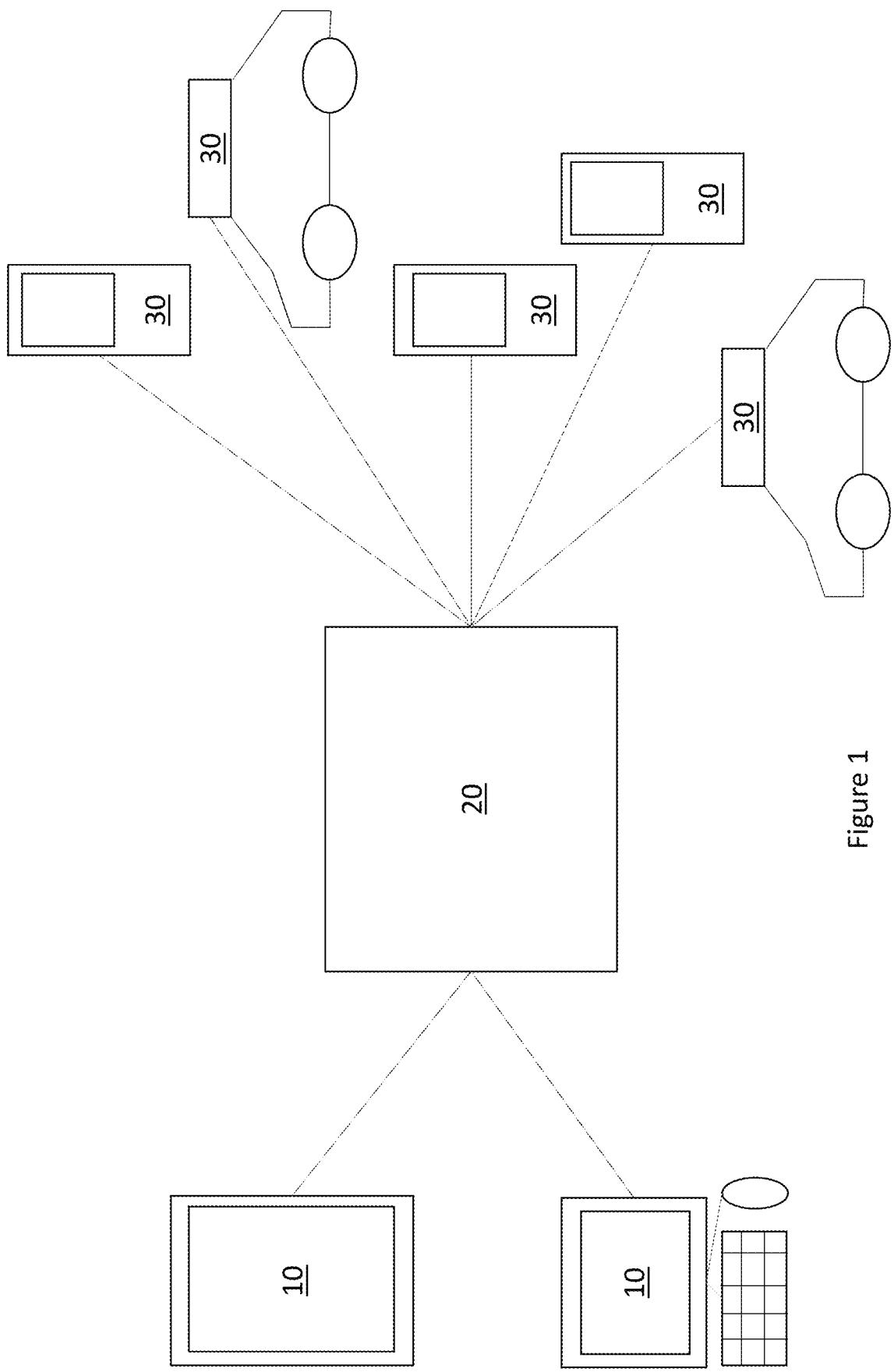
FIG. 1 is a simplified plan view of an exemplary system.

FIG. 1 is a simplified block diagram of an exemplary system. A number of display assemblies 30 may be in communication with a monitoring center 20. Similarly, a number of client devices 10 may be in communication with the monitoring center 20. The display assemblies 30 may be located remote from the monitoring center 20. Likewise, the client devices 10 may be located remote from the monitoring center 20. The communication between the display assemblies 30, the monitoring center 20, and the client devices 10 may be made by way of a network 80. The network 80 may be any network such as a cellular network, internet, intranet, world wide web, or the like. The network 80 between the client devices 10 and the monitoring center 20 may be the same or may be different from the network 80 between the monitoring center 20 and the display assemblies 30.

Each of the display assemblies 30 may be any kind of display assembly 30, such as but not limited to, a free-standing display kiosk configured for placement on a sidewalk, a wall-mounted display unit, a vehicle topper unit, or the like. Each of the client devices 10 may be a personal electronic device such as, but not limited to, a smartphone, tablet, smartwatch, laptop, desktop computer, some combination thereof, or the like.

Figure 2:
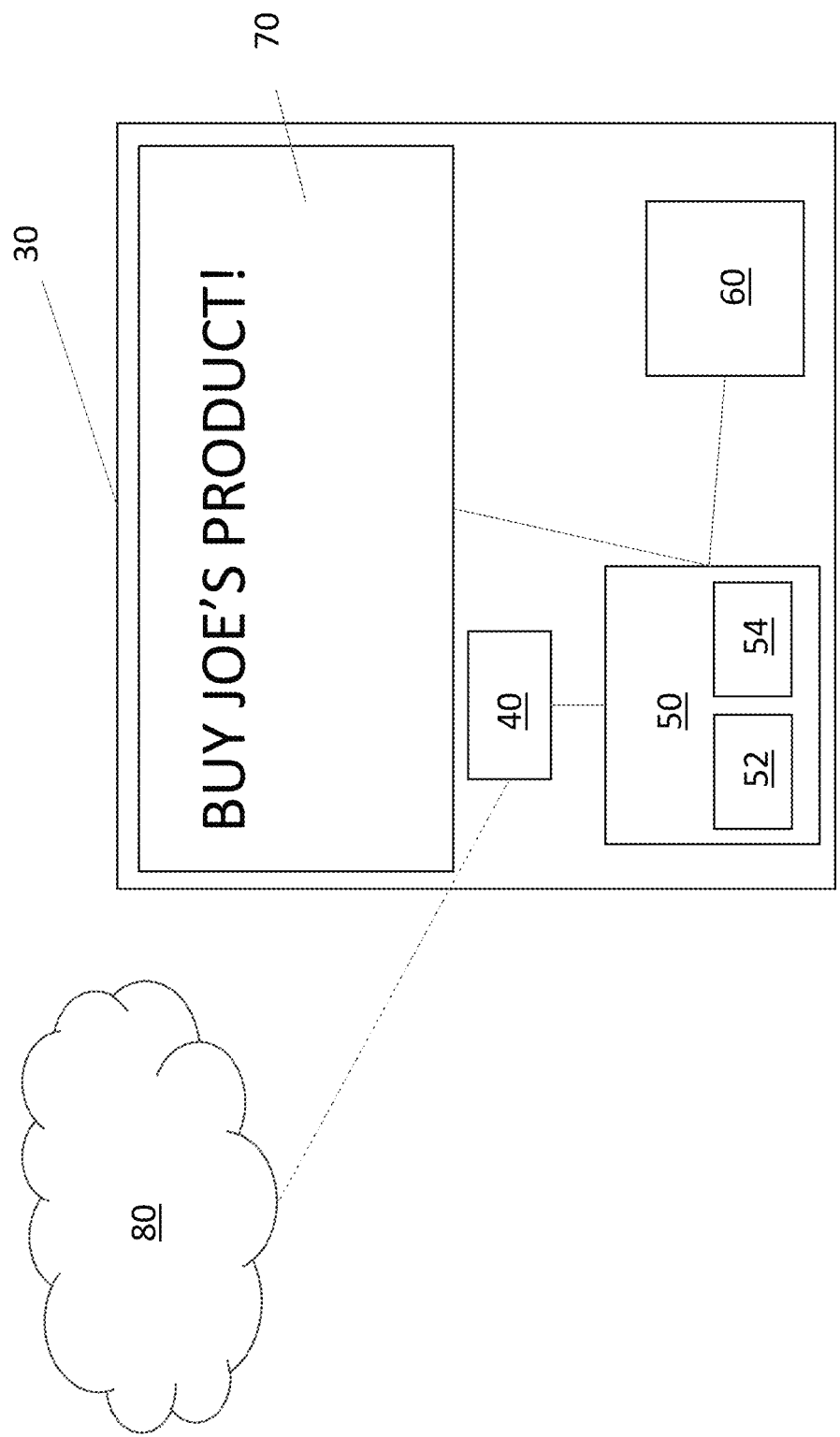
FIG. 2 is a detailed view of an exemplary display assembly of FIG. 1.

FIG. 2 is a detailed view of an exemplary display assembly 30 of FIG. 1. Each display assembly 30 may comprise one or more electronic displays 70 in electrical connection with a display controller 50. Each electronic display 70 may comprise a backlight for illuminating the electronic display 70. The electronic display 70 may comprise one or more a liquid crystal displays, light emitting diode ("LED") displays, organic LED displays, plasma displays, some combination thereof, or the like. One or more of the electronic displays 70 may comprise touch capabilities. The backlight may be comprised of a number of LEDs arranged in a directly backlit, edge-lit, or other orientation.

In exemplary embodiments, the display controller 50 may be in electrical connection with other components 60 for operating the display assembly 30. Such components 60 may include, but are not limited to, fans, temperature sensors, light sensors, fan speed sensors, power consumption sensors, air quality sensors, weather sensors, other sensors, telephone equipment, video conferencing equipment, voice-over-internet-protocol (VOIP) equipment, touch screens, camera, microphones, emergency notification devices, processors, electronic storage devices, wayfinding equipment, location detection devices, video players, proof of play devices, and the like. Any number, combination, and/or type of components are contemplated.

The display controller 50 may be configured to gather operations data from the electronic display 70. The display controller 50 may, alternatively or additionally, be configured to gather operations data from the components 60. Such operations data may include, but is not limited to, proof of play data, fan speed data, temperature data, humidity data, power consumption data, ambient light data, weather data, backlight data, electronic display data, status data, emergency notification data, air quality data, sensor readings, camera images or video recordings, microphone audio recordings, use history, and the like. The operations data for multiple clients may be co-located at the electronic storage device 52 located at the display assembly 30. Portions of the operations data may be associated with one or more client identifiers. For example, without limitation, operations data associated with a particular image displayed on the electronic display 70 may be associated with a particular client identifier. Alternatively, or in addition, all operations data originating from one or more display assemblies 30 may be associated with one or more client identifiers. This may permit for specific clients to access and retrieve only the operations data associated with the particular client—permitting the co-location of such operations data while maintaining privacy. The association with a client identifier may be performed at the display assembly 30 or at the monitoring center 20. The client identifiers may be, without limitation, unique alphanumeric serial numbers.

The display controller 50 may be in electrical communication with a network connection device 40. The network connection device 40 may be configured to transmit information to the monitoring center 20, including but not limited to, the operations data. In exemplary embodiments, the network connection device 40 may likewise be configured to receive information from the monitoring center 20, including but not limited to, operation instructions. Such operations instructions may comprise remote login capabilities, remote viewing, fan speed instructions, backlight adjustment instructions, video or image files for display on the electronic displays 70, some combination thereof, or other instructions for operation of the display assembly 30. The network connection device 40 may transmit and/or receive such information by way of the network 80.

The display controller 50 may comprise an electronic storage device 52 for storing the operations data and/or operations instructions. The display controller 50 may also comprise a processor 54 for processing the operations data and/or operations instructions. The electronic storage device 52 may comprise software instructions, which when executed, configure the processor 54 to perform various steps and processes described herein.

Figure 3:
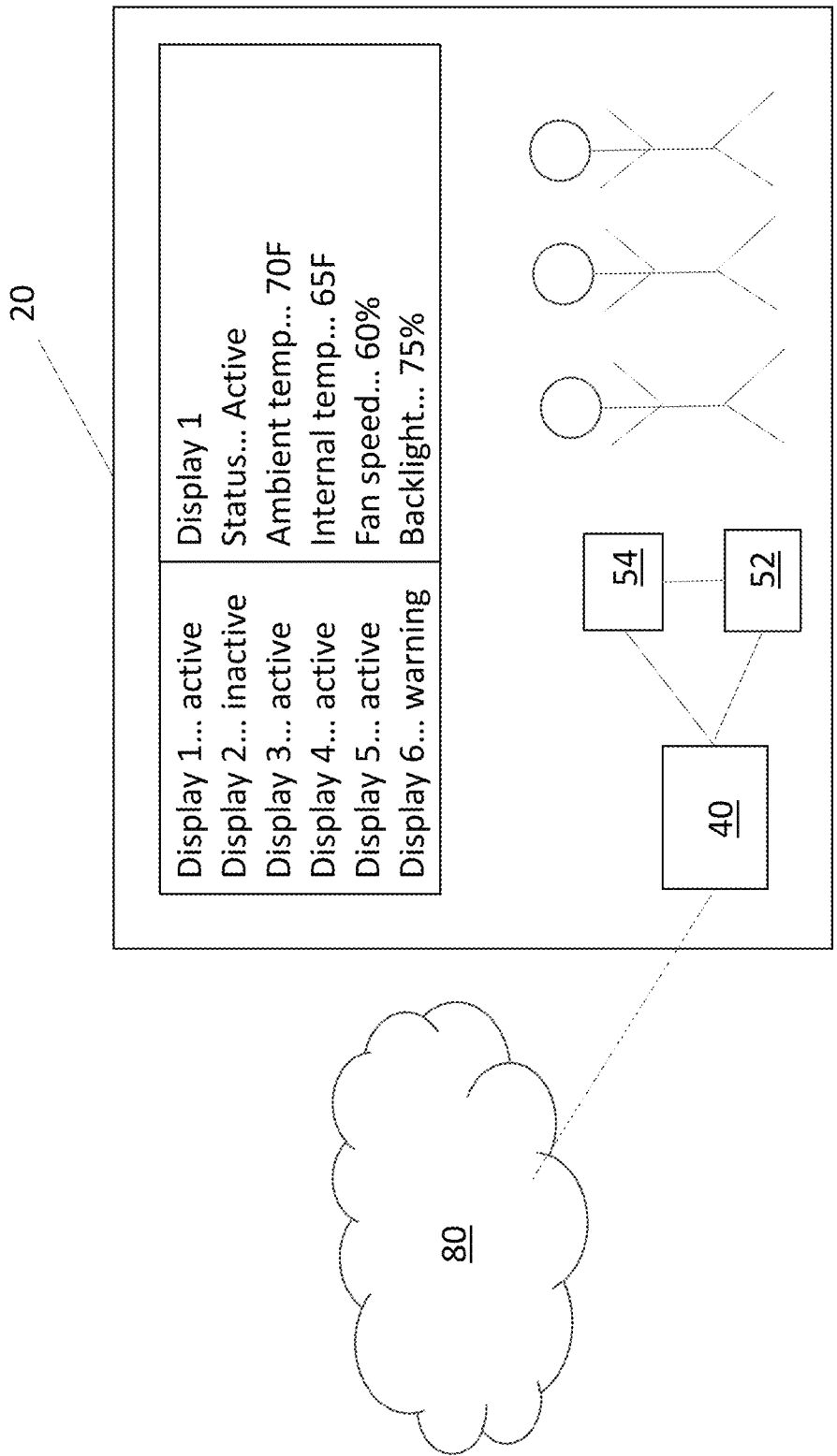
FIG. 3 is a detailed view of an exemplary monitoring center of FIG. 1.

FIG. 3 is a detailed view of an exemplary monitoring center 20 of FIG. 1. The monitoring center 20 may comprise an electronic storage device 52 for storing the operations data and/or operations instructions. The monitoring center 20 may also comprise a processor 54 for processing the operations data and/or operations instructions. The electronic storage device 52 may comprise software instructions, which when executed, configure the processor 54 to perform various steps and processes described herein. The processor 54 may be the same or different from the processor 54 of the display assembly 30.

The monitoring center 20 may further comprise a network connection device 40. The network connection device 40 may be in electrical communication with the processor 54 and the electronic storage device 52. The network connection device 40 may be in electrical communication with one or more of the display assemblies 30. The network connection device 40 may be configured to receive operations data from the one or more display assemblies 30. The network connection device 40 may also be configured to transmit operations instructions to one or more of the display assemblies 30.

The network connection device 40 may be receive the operations data and pass it to the electronic storage device 52 for storage. The operations data for multiple display assemblies 30 may be co-located at the electronic storage device 52 located at the monitoring center 20. Co-location may be accomplished by associating portions of the operations data with one or more client identifiers. Each portion of the operations data associated with a particular client identifier may be stored on a common electronic storage device 52, but electronically partitioned to ensure that the operations data associated with each particular client is maintained separate.

Alternatively, or in addition, all operations data originating from one or more display assemblies 30 may be associated with one or more client identifiers. This may permit for specific clients to access and retrieve only the operations data associated with the particular client—permitting the co-location of such operations data while maintaining privacy. The network connection device 40 may transmit and/or receive such operations data and/or operations instructions by way of the network 80.

The gathering, transmitting, storing, receiving, and retrieving of operations data and/or operations instructions as shown and described herein may be accomplished, wholly or in part, by the use of a microservices architecture. Any of the other steps or methods described herein may likewise be accomplished, wholly or in part, by the use of a microservices architecture.

The monitoring center 20 may be a brick-and-mortar location staffed with a number of monitoring personnel, though such is not required. In exemplary embodiments, the monitoring center 20 may comprise one or more rooms with one or more displays which may provide status and/or operations information for one or more display assemblies 30. For example, without limitation, a complete or partial list of display assemblies 30 and status information for each display assembly 30 may be shown. Information for a subset of display assemblies 30 may be shown in a rotating, scrolling, or other fashion. Detailed information regarding one or more display assemblies 30 may be shown on the same or a separate screen. A number of personal electronic devices, such as but not limited to, smartphone, tablet, smartwatch, laptop, desktop computer, some combination thereof, or the like may likewise display some or all of the information and may be configured to receive user input comprising operational instructions for one or more of the display assemblies 30.

Figure 4:
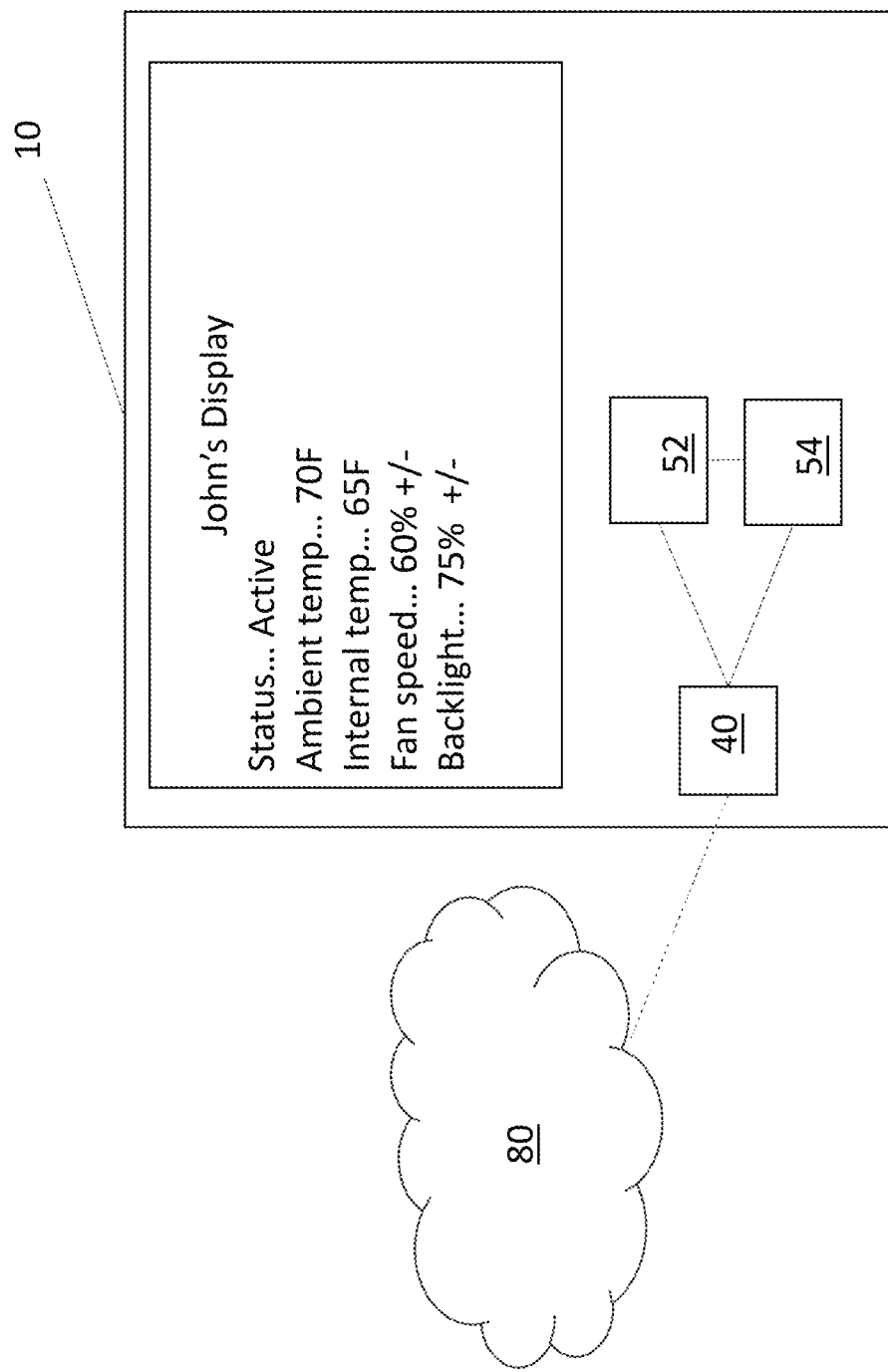
FIG. 4 is a detailed view of an exemplary client device of FIG. 1.

FIG. 4 is a detailed view of an exemplary client device 10 of FIG. 1. The client device 10 may be any personal electronic device, including but not limited to, a smartphone, tablet, smart watch, laptop, desktop computer, some combination thereof, or the like. The client device 10 may comprise an electronic storage device 52 for storing the operations data and/or operations instructions. The client device 10 may also comprise a processor 54 for processing the operations data and/or operations instructions. The electronic storage device 52 may comprise software instructions, which when executed, configure the processor 54 to perform various steps and processes described herein. The processor 54 may be the same or different from the processor 54 of the client device 10.

The client device 10 may further comprise a network connection device 40. The network connection device 40 may be in electrical communication with the processor 54 and the electronic storage device 52. The network connection device 40 may be in electrical communication with the monitoring center 20. The network connection device 40 may be configured to receive operations data from the one or more display assemblies 30 by way of the monitoring center 20. In exemplary embodiments, the network connection device 40 may be receive such operations data and store it on the electronic storage device 52. The network connection device 40 may be configured to transmit operations instructions to the monitoring center 20. The network connection device 40 may transmit and/or receive such information by way of the network 80. In exemplary embodiments, the receipt of operations data and/or transmission of operations instructions is accomplished by use of an internet browsing application and an internet-based user interface or report 90.

Figure 5:
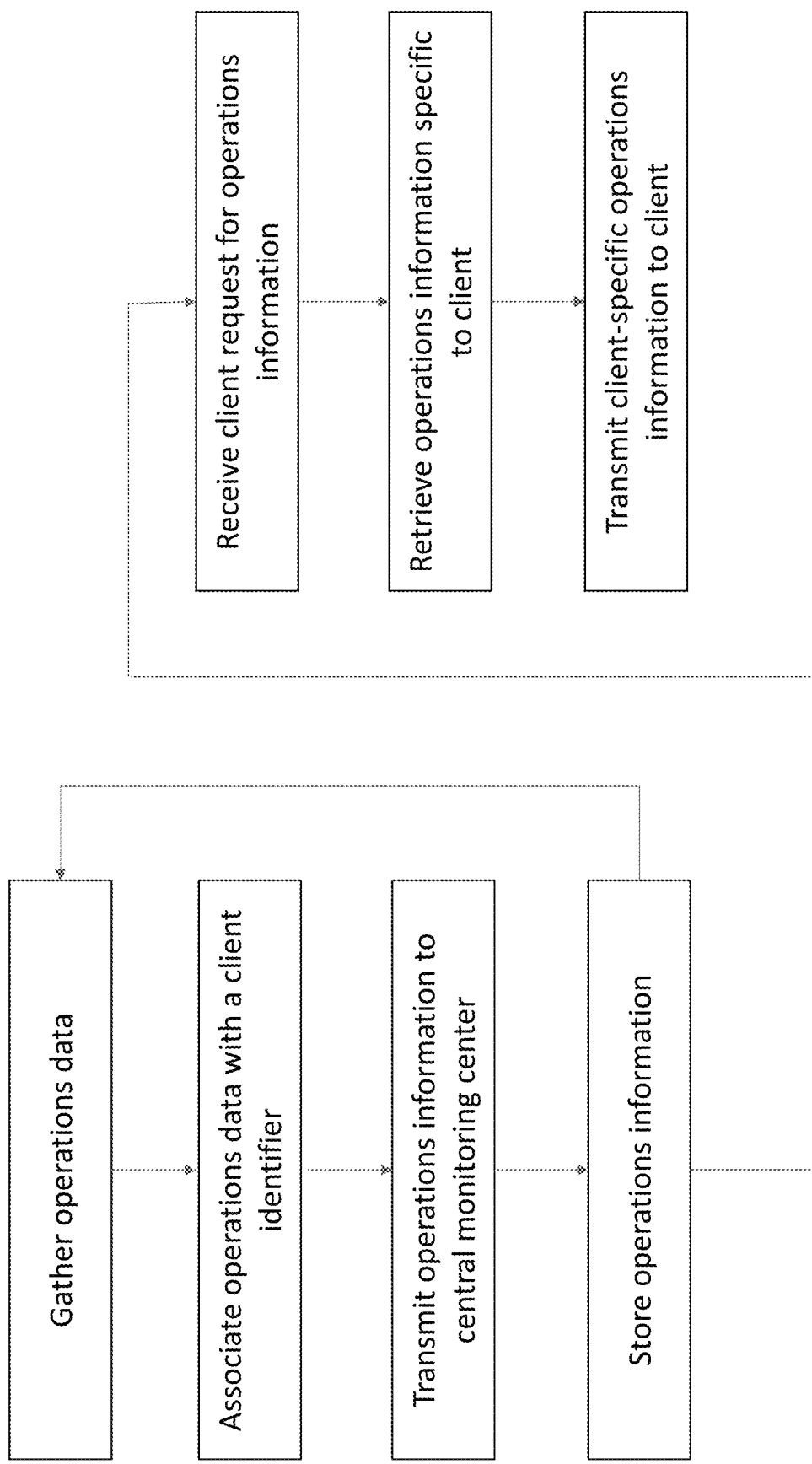
FIG. 5 is a flow chart of exemplary logic for use with the system of FIG. 1.

FIG. 5 is a flow chart of exemplary logic for use with the system of FIG. 1. The display controller 50 may gather operations data the one or more electronic displays 70 and/or the other components 60 of the respective display assembly 30. The operations data may be associated with one or more client identifiers. This operations data may be stored on the electronic storage device 52 of the respective display assembly 30. The operations data may be transmitted by way of the network connection device 40 and the network 80 to the monitoring center 20 where it may be stored on one or more electronic storage devices 52 at the monitoring center 20. In exemplary embodiments, the processor 54 at the monitoring center 20 may associate the operations data with one or more client identifiers. The processor 54 may electronically partition the electronic storage device 52 such that operations data associated with each particular client identifier is kept separate from operations data associated with other client identifiers. This process may be repeated continuously or at any interval. Alternatively, or in addition, a client identifier may be associated with the operations data when transmitted to the monitoring center 20.

A client request for operations data may be received from one or more of the client devices 10 at the monitoring center 20. The monitoring center 20 may retrieve the operations data associated with the client. In exemplary embodiments, this may involve retrieving all operations data associated with one or more of the display assemblies 30 associated with the client. Alternatively, or in addition, operations data specific to the client from a particular display assembly 30 may be retrieved. Stated another way, any single display assembly 30 may comprise operations data for multiple clients and only the operations data specific to the particular client may be retrieved. The retrieved operations data specific to the client may then be transmitted to the appropriate client device(s) 10. In exemplary embodiments, data specific to the client may be identified by way of the client identifiers. Operations data may be requested from each electronic display assembly 30 periodically, continuously, sequentially, in a particular order, some combination thereof, or the like.

Figure 6:
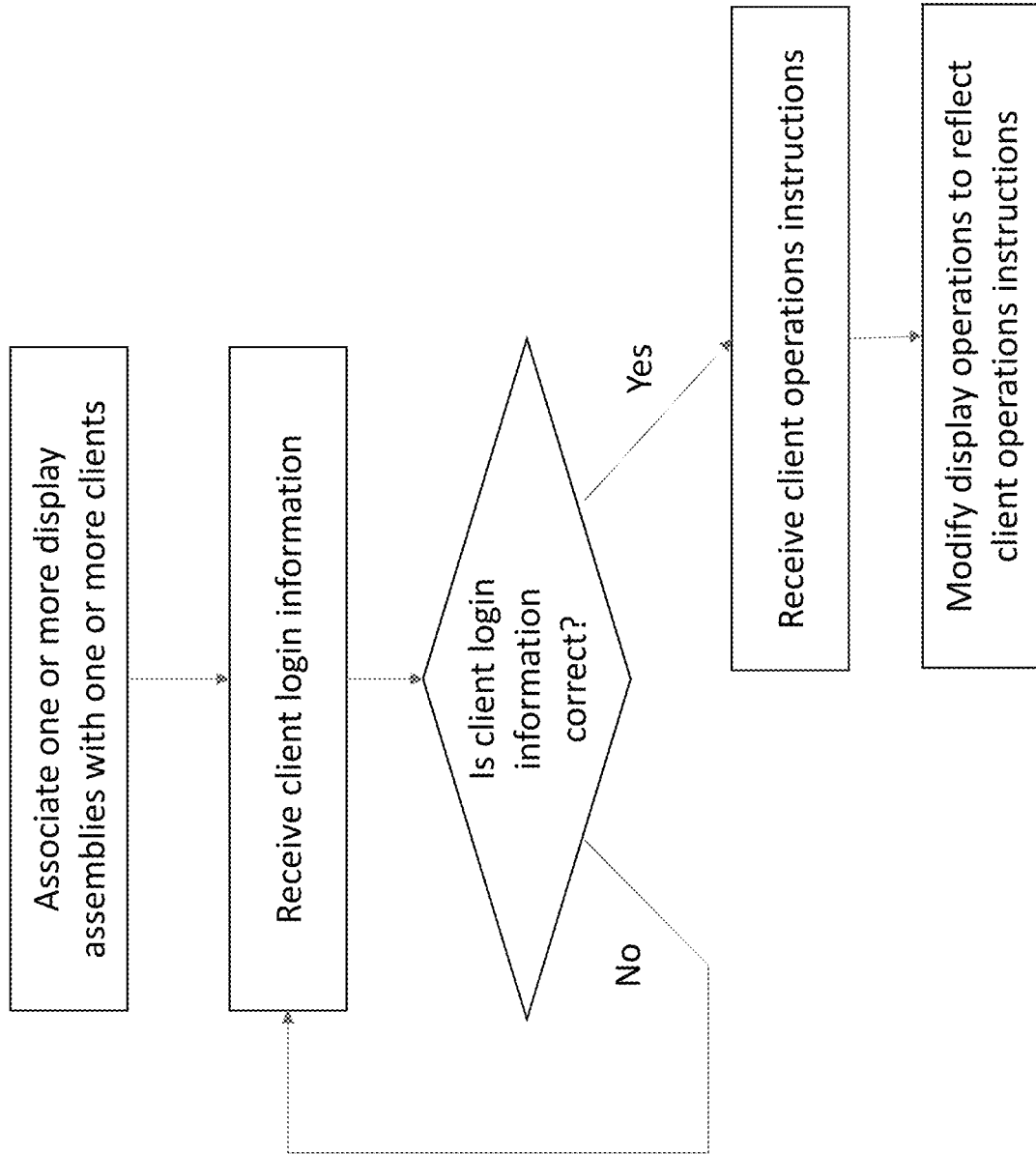
FIG. 6 is a flow chart of other exemplary logic for use with the system of FIG. 1.

FIG. 6 is a flow chart of other exemplary logic for use with the system of FIG. 1. One or more display assemblies 30 may be associated with one or more clients. A client login request may be received by way of one or more client devices 10 at the monitoring center 20. If the client login is not successful (e.g., if the user name and/or password are incorrect) the request may be denied. If the client login is successful (e.g., the user name and password are correct) the client may be permitted to remotely access one or more display assemblies 30 associated with the client. In exemplary embodiments, client login may be made by way of user name and password, one time use codes, biometric information, some combination thereof, or the like. Any method or system for verifying client identity is contemplated. Such access may be made by way of the monitoring center 20. The client may be able to view and retrieve operations data for the one or more display assemblies 30 associated with the client. The client may also be permitted to submit operation instructions for the one or more display assemblies 30 associated with the client. The operations of the one or more display assemblies 30 associated with the client may then be modified to reflect the received client operation instructions. Permissions may be tailored on a per client basis such that only certain display assemblies 30 may be accessed and/or modified when particular client login information is provided.

Figure 7:
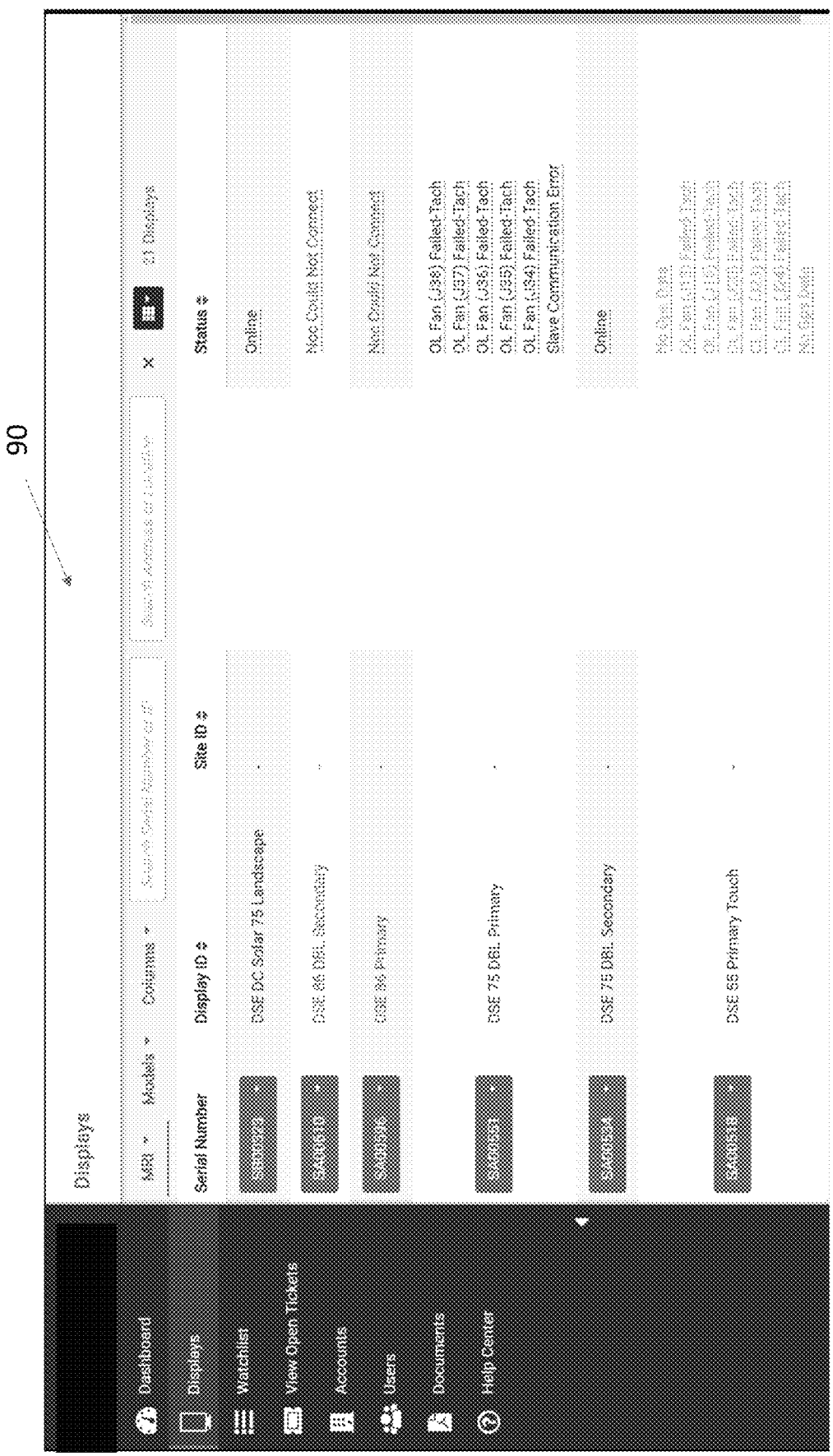
FIG. 7 is an exemplary user interface for use with the system of FIG. 1.

FIG. 7 is an exemplary user interface or report 90 for use with the system of FIG. 1. The user interface or report 90 may display overview information regarding a number of display assemblies 30, each of which may be associated with a particular client though such is not required. Information about each display assembly 30 may include, but is not limited to, the serial number, description information, site information, and status information of each display assembly 30. Status information, current and/or historical, may also be provided.

Figure 8:
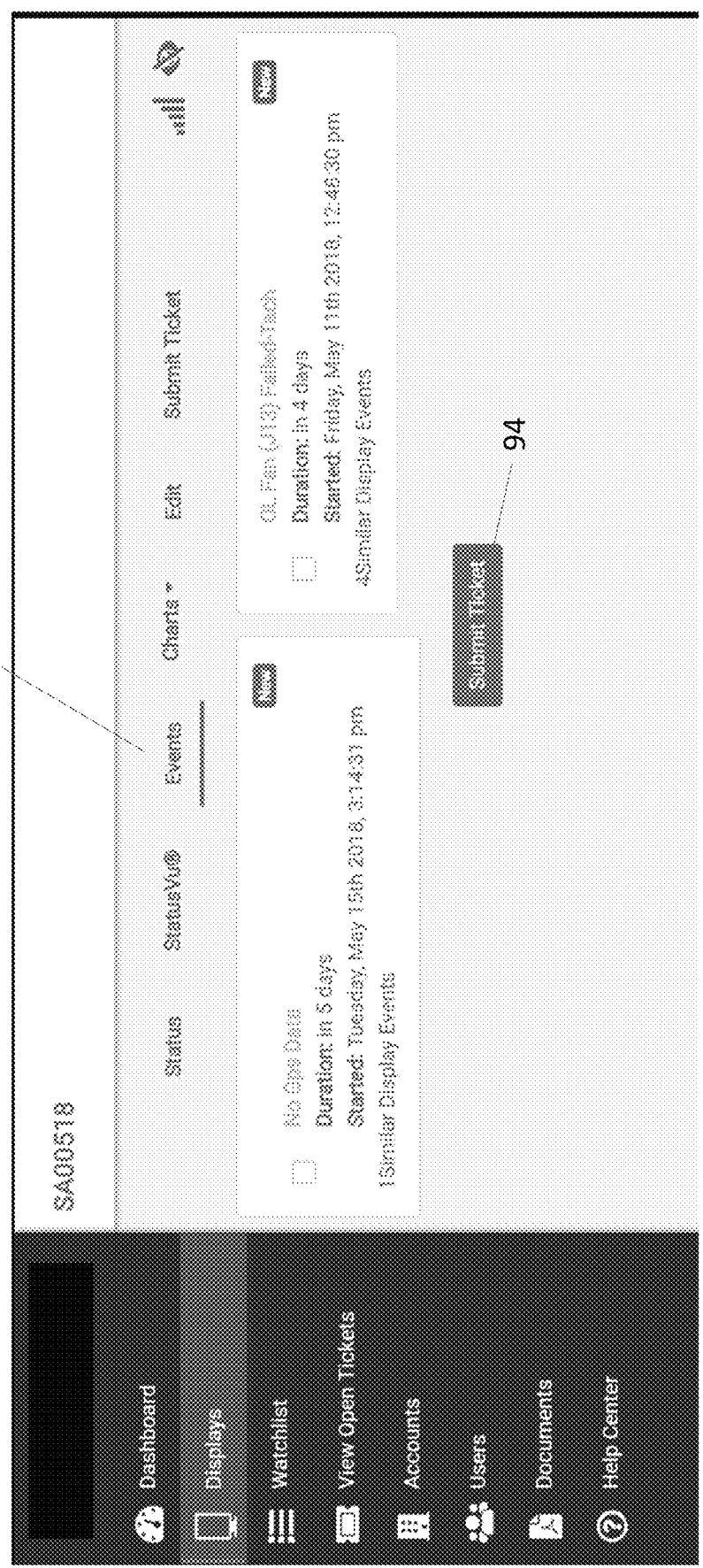
FIG. 8 is another exemplary user interface for use with the system of FIG. 1.

As shown in FIG. 8, event information for each of the display assemblies 30 associated with a particular client may be depicted under an events tab 92. The event information may include, but is not limited to, errors and warnings associated with one or more particular display assemblies 30. An option to automatically generate a repair request ticket 94 may be provided for each event.

Figure 9:
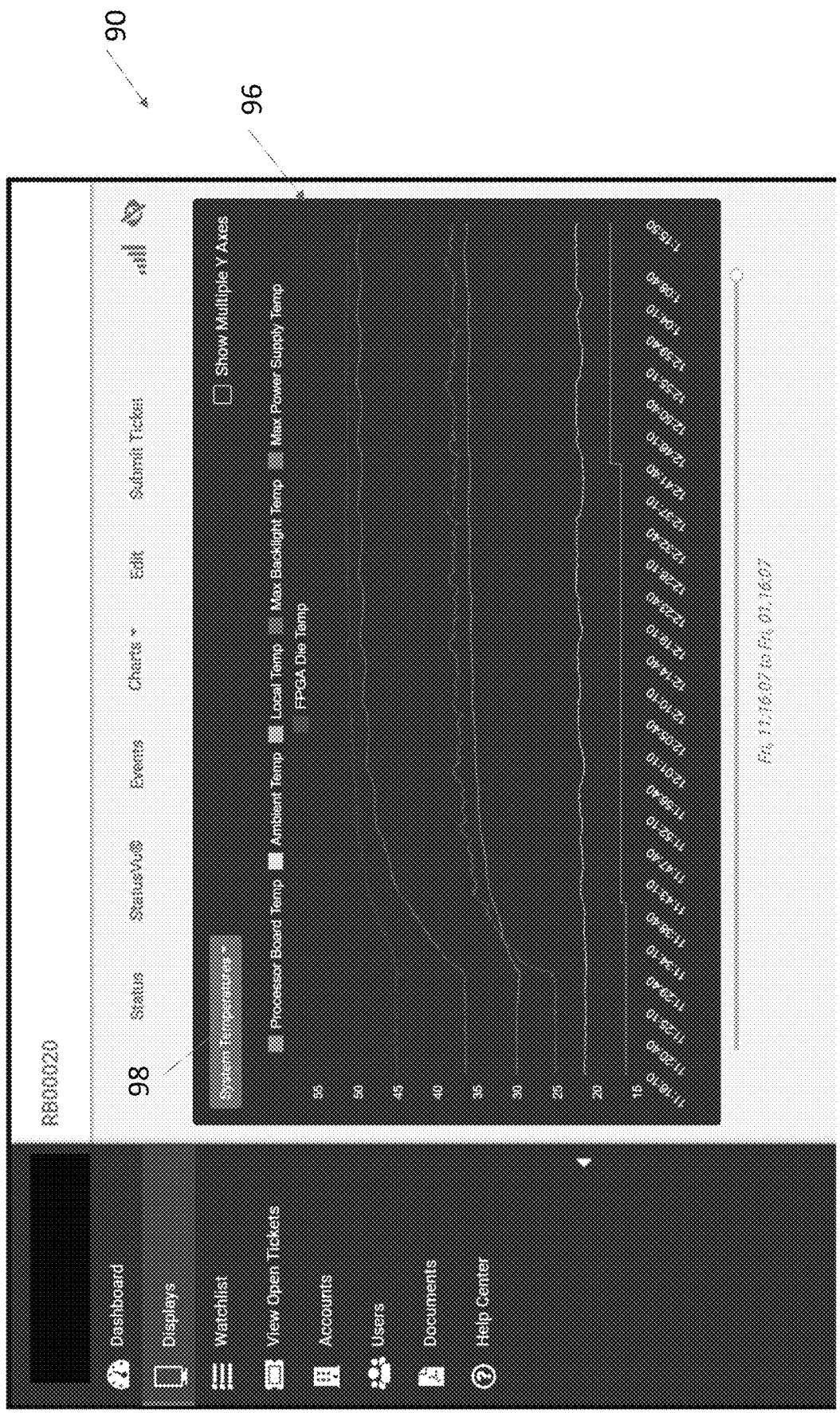
FIG. 9 is another exemplary user interface for use with the system of FIG. 1.

FIG. 9 is another exemplary user interface or report 90 for use with the system of FIG. 1. A visualization 96 of current and historical operations data may be displayed. Such operations data may comprise data from one or more sensors associated with a display assembly 30. In exemplary embodiments, the visualization 96 may be displayed in tabular form or a graphical representation such as, but not limited to, a line chart, bar chart, scatter diagram, or the like. Various categories of data may be depicted in the visualization 96 as selected by use of a menu 98. Such categories may be displayed in a color-coded fashion.

Figure 10:
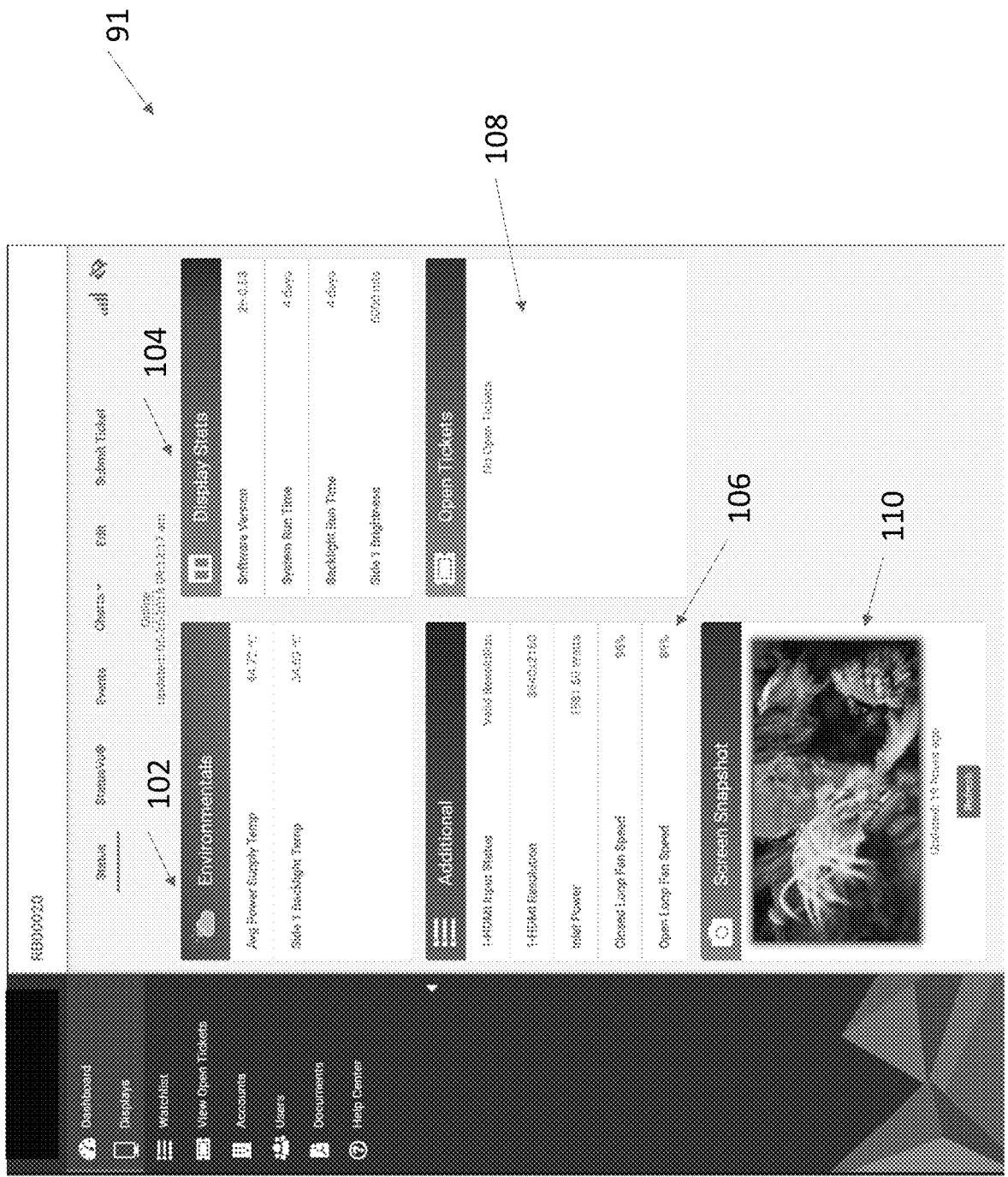
FIG. 10 is another exemplary user interface for use with the system of FIG. 1.

FIG. 10 is an exemplary summary dashboard 91, which may be configured to display summary information regarding a particular display assembly 30. Environmental information 102 may be displayed such as, but not limited to, the average power supply temperature and average backlight temperature. Display status information 104 may also be displayed such as, but not limited to, the software version, the system run time, the backlight run time, and the brightness of each display. Additional information 106 may also be displayed such as, but not limited to, the status and resolution of various inputs, the inlet power supply, and the fan speed of various fans in the display assembly 30. Any open repair request tickets may be displayed at an open ticket information area 108. A screen capture 110 of what is currently being displayed, was previously displayed, and/or is scheduled to be displayed next on the display assembly 30 may also be provided.

Figure 11:
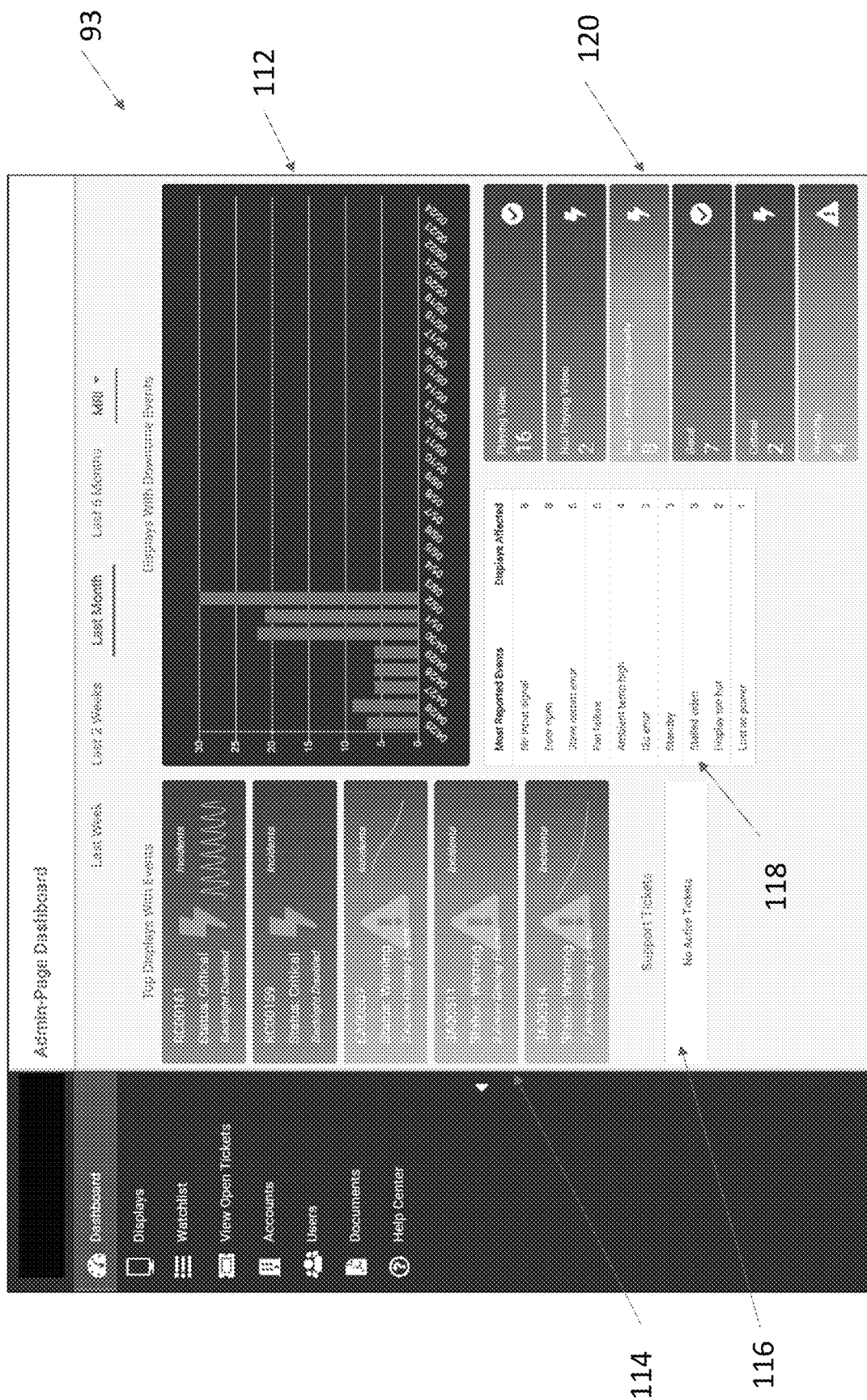
FIG. 11 is another exemplary user interface for use with the system of FIG. 1.

FIG. 11 is another exemplary summary dashboard 93, which may be configured to display summary information regarding all display assemblies 30 associated with a particular client identifier. The number of display assemblies 30 with some downtime event may be depicted in a downtime visualization 112. In exemplary embodiments, the downtime visualization 112 is a bar graph tracked by date, though any form of visualization is contemplated. A listing of top display assemblies with events 114 may be provided. A summary of repair ticket requests 116 may also be provided depicting all open repair ticket requests. A summary of the most reported events 118 may list the event(s) in question and the number of display assemblies 30 affected by the given event(s). The summary of the most reported events 118 may be presented in tabular form, though such is not required. Finally, a status summary 120 of all display assemblies 30 associated with a given client identifier may be provided. The status summary 120 may include, but is not limited to, the number of display assemblies 30 associated with the given client identifier which are playing video, not playing video, having no or limited network connectivity, in good condition, in critical condition, or having one or more warning events.

The information displayed and the manner in which it is displayed is merely exemplary and is not intended to be limiting. It is contemplated that any kind of data may be displayed in any format.

FIG. 12A through FIG. 12B illustrate exemplary display assemblies 30. The electronic displays 70 may be secured to a structural subassembly 71, though such is not necessarily required. The structural subassembly 71 may comprise one or more panels, housings, members, combinations thereof, or the like. The structural subassembly 71 may be configured for mounting to a ground surface (e.g., sidewalk, parking lot), wall, vehicle, combinations thereof, or the like. The structural subassembly 71 may comprise or provide a framework for mounting one or more of the electronic displays 70 and/or additional components of the display assemblies 10.

The electronic displays 70 may comprise one or more electronic display layers 73, such as but not limited to, liquid crystal layers, organic light emitting diodes, or the like. Any type or kind of electronic display may be utilized. The electronic display layers 73 may be set within a housing, behind a cover layer, within a framework of members, combinations thereof, or the like. The electronic displays 70 and/or the electronic display layers 73 may be provided in any size and/or shape.

A single one or multiple ones of the electronic displays 70 may be secured to any given one of the structural subassemblies 71.

The electronic displays 70 may be moveably secured to the structural subassemblies 71, though such is not necessarily required. For example, without limitation, the electronic displays 70 may be configured for rotational movement between a closed position and an opened position. In exemplary embodiments, without limitation, an upper portion or edge of the electronic displays 70 may be secured to the structural subassembly 71 in a hinged fashion. The closed position may include securing a bottom or other edge of the electronic display 70 to the structural subassembly 71. Alternatively, or additionally, a rear surface of the electronic display and/or interior of the structural assembly 71 may be wholly and/or substantially inaccessible while the electronic displays 70 are in the closed position. The opened position may include rotating the bottom edge or other edge of the electronic display 70 away from the structural subassembly 71. Alternatively, or additionally, the rear surface of the electronic display 70 and/or interior of the structural subassembly 71 may be wholly, partially, and/or substantially accessible while the electronic displays 70 are in the opened position. The electronic displays 70 may be configured for movement along a vertical axis, horizontal axis, or the like. The electronic displays 70 may be hinged or configured for movement along an upper edge, lower edge, side edge, combinations thereof, or the like.

Where multiple electronic displays 70 are utilized (e.g., back-to-back units), some or all of the multiple electronic displays 70 may be configured for movement.

Alternatively, or additionally, as illustrated with particular regard to FIG. 12B, the display assemblies 30 may comprise one or more access panels 75. The access panels 75 may comprise doors. Movement of the access panels 75 into the opened position may permit access to the rear surface of the electronic display 70 and/or interior of the structural subassembly 71, by way of non-limiting example. Movement of the access panels 75 into the closed position may prevent or inhibit access to the rear surface of the electronic display 70 and/or interior of the structural subassembly 71, by way of non-limiting example. Access panels 75 may be utilized with single-sided units, by way of non-limiting example. For example, without limitation, access panels 75 may be connected to an opposing side of the structural assembly 71 compared to an electronic display 70, though such is not required. The access panels 75 may comprise blank covers (e.g., sheet metal, printed glass, combinations thereof, or the like), poster cavities (illuminated or otherwise), combinations thereof, or the like. The access panels 75 may be moveably secured to the structural subassembly 71, though such is not necessarily required.

Some or all of the display assemblies 30 may comprise one or more latching devices 61. The latching devices 61 may be configured to selectively secure the electronic displays 70 and/or access panels 75 of the display assemblies 30 in the closed position, such as when the latching devices 61 are in a latched configuration, for example without limitation. When in an unlatched configuration, the latching devices 61 may permit movement of the electronic displays 70 and/or access panels 75 of the display assemblies 30 into the opened position.

The latching devices 61 may be configured for manual and/or electronic actuation. For example, without limitation, the latching devices 61 may comprise one or more handles, buttons, levers, gears, hooks, catches, combinations thereof, or the like for manual and/or local operation. Alternatively, or additionally, the latching devices 61 may comprise one or more motors, solenoids, actuators, magnets, cams, shafts, pins, tumblers, combinations thereof, or the like and/or may be in electronic communication with the controller 50 for electronic and/or remote operation. Any type and/or kind of latching device 61 may be utilized.

The latching devices 61 may comprise locking devices 63. The locking devices 63 may be configured for movement between a locked position and an unlocked position. For example, without limitation, when in the locked position, the locking devices 63 may be configured to prevent the latching devices 61 from moving into the unlatched position, such as to prevent movement of the electronic displays 70 and/or access panels 75 from the closed position into the opened position. As another example, without limitation, when in the unlocked position, the locking devices 63 may be configured to permit the latching devices 61 to move into the unlatched position, such as to permit movement of the electronic displays 70 and/or access panels 75 from the closed position into the opened position.

The latching devices 61 and/or locking devices 63 may be configured for any type or kind of user interaction, such as but not limited a key access, combination access, biometric access, combinations thereof, or the like. Any type and/or kind of locking device 63 may be utilized.

The latching devices 61 may be located along a lower edge of the display assembly. However, any location of the latching devices 61 may be used, such as to permit rotation of the electronic displays 70 and/or access panels 75 in a given direction.

The latching devices 61 may comprise one or more switches 65, such as micro-switches, sensors (e.g., optical sensors, pressure sensors, switches), locking devices 63, latches, actuators, buttons, handles, combinations thereof, or the like. The status of the latching devices 61 may be periodically monitored and/or updated. The latching devices 61 may be remotely operated, such as but not limited to, between a locked and unlocked position and/or latched and unlatched positions.

In exemplary embodiments, without limitation, the latching devices 61 may comprise one or more switches 65, and/or such switches 65 may be separately provided. The switches 65 may be located to detect movement of the electronic displays 70 and/or access panels 75 between the opened and/or closed positions. For example, without limitation, the switches 65 may be interposed between the electronic displays 70 and the structural subassembly 71. Alternatively, or additionally, such switches 65 may be physically or electronically connected to said latching devices 61, such as to detect status of the locking devices and/or latching devices (e.g., locked or unlocked positioned, latched and/or unlatched position). In this fashion, the status of the electronic displays 70 and/or access panels 75 may be remotely monitored (e.g., if in locked position, unlocked position, opened position, and/or closed position) and/or operated (e.g., moved between locked and unlocked positions, and/or opened and closed positions).

The latching devices 61 may be one of the components 60 and/or in electronic communication with the controller 50, by way of non-limiting example. Alternatively, or additionally, the latching devices 61 and/or components thereof may be separately provided.

The display assemblies 30 may comprise one or more movement assistance devices 67. The movement assistance devices 67 may comprise, for example without limitation, gas springs, motors, gears, levers, or the like. The movement assistance devices 67 may be manually and/or electronically operated. The movement assistance devices 67—may be one of the components 60 and/or in electronic communication with the controller 50, by way of non-limiting example. Alternatively, or additionally, the movement assistance devices 67 may be separately provided. The movement assistance devices 67 may be locally and/or manually operated and/or operated remotely, such as for moving the electronic displays 70 and/or access panels 75 between the locked and unlocked positions and/or opened and closed positions.

The latching devices 61 may be interposed between the electronic displays 70 and/or access panels 75 and the structural subassembly 71, and/or be connected in whole or in part to one or both thereof.

Figure 13:
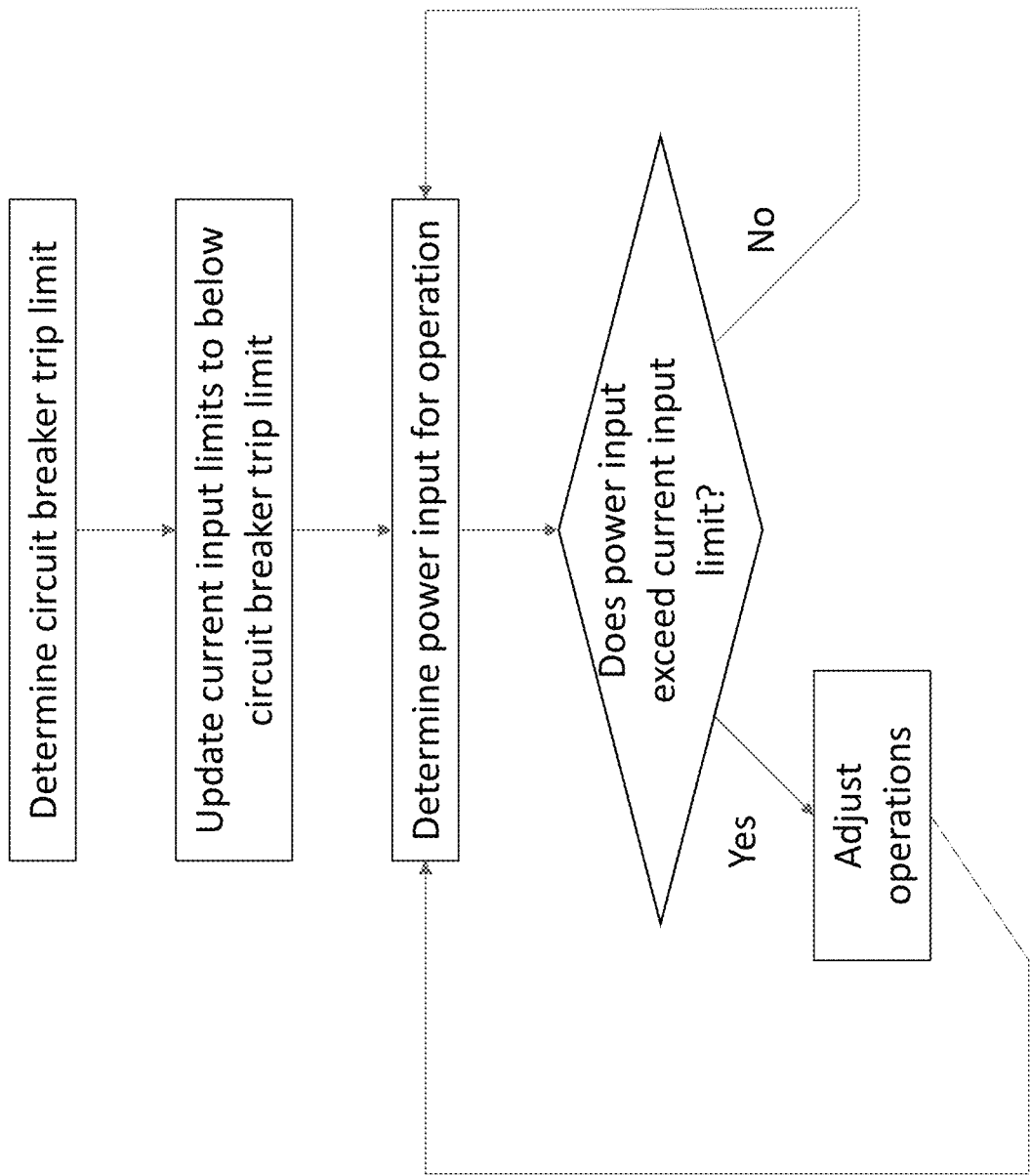
FIG. 13 is a flow chart with exemplary logic for use with the system of at least FIG. 1.
Figure 14:
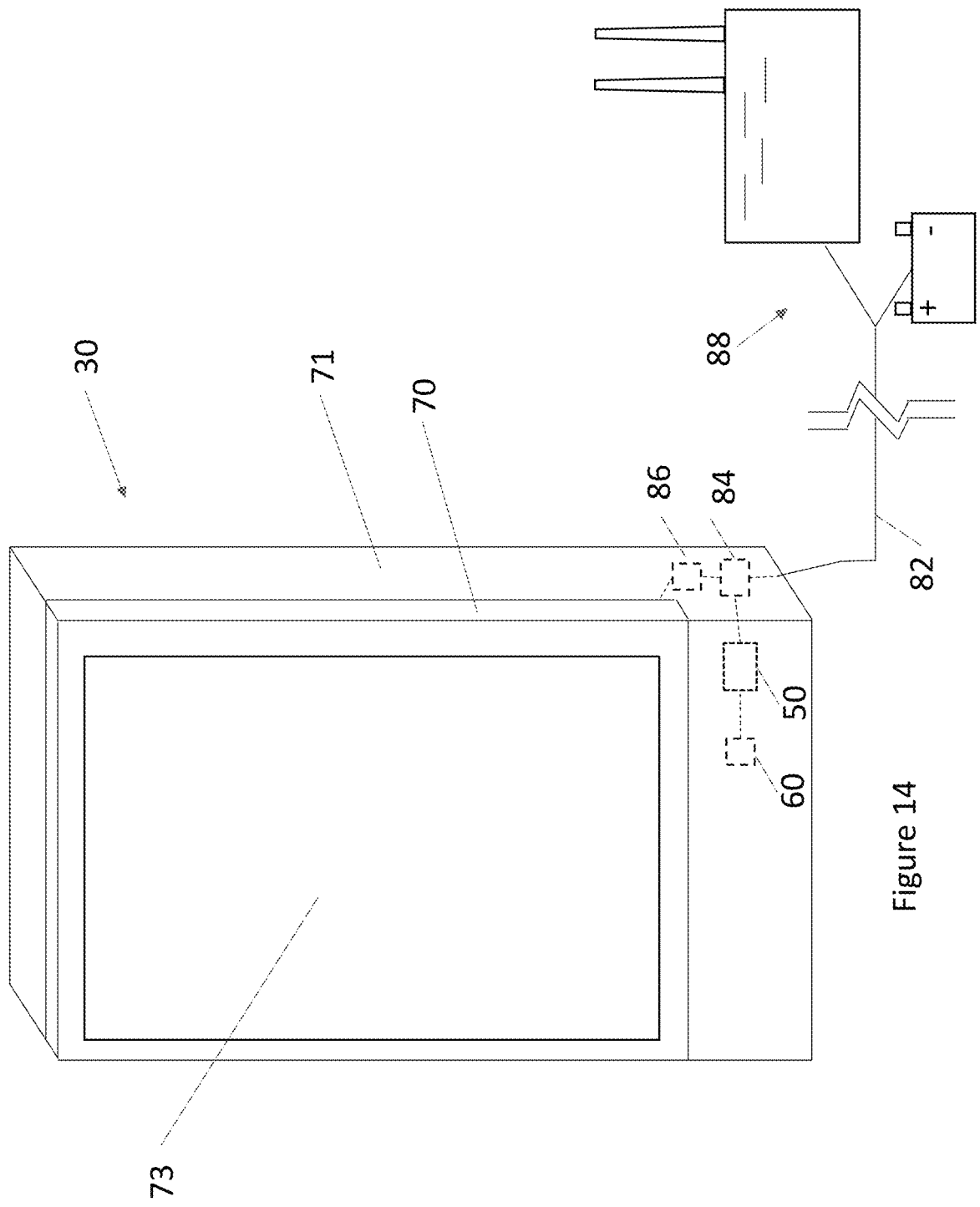
FIG. 14 is a front perspective view of another exemplary display assembly and related components for use with at least the system of FIG. 1 and the method of FIG. 13.

FIG. 13 illustrates a flow chart for remotely establishing power limits, such as but not limited to alternating current ("AC") power input limits by way of non-limiting example. Direct current ("DC") power input limits may alternatively or additionally be used. FIG. 14 illustrates an exemplary display assembly 30 with power consumption limiting features.

One or more power lines 82 may electrically connect one or more external power sources 88 to the display assembly 30. The external power sources 81 may comprise a utility power supply, solar panels, batteries, bulk energy storage devices, alternators, generators, power plants, combinations thereof, or the like. The display assembly 30 may comprise one or more circuit breakers 84. The circuit breakers 84 may be electrically interposed between some or all of the external power source(s) 81 and some or all of the electricity consuming components of the display assembly 30, such as but not limited to the electronic displays 70 and components 60. The circuit breakers 84 may be internal to and/or external to the display assembly 30.

Trip limits of the circuit breakers 84 may be determined. Such trip limits may be determined manually. For example, without limitation, the known trip limits may be electronically inputted at one or more of the interfaces 90. The trip limits may be set by voltage rating, frequency rating, current rating, breaking capacity, making capacity, operating sequence, short-circuit current rating, short-circuit withstand rating, combinations thereof, or the like. Any number, type, kind, and/or arrangement of the circuit breakers 84 may be utilized.

AC current input limits, or other power limits, for the display assembly 30 may be set to below the circuit breaker 84 trip limit, such as to prevent or limit nuisance trips of power breakers. The power limits may be set to a predetermined amount below the trip limit in exemplary embodiments, without limitation. For example, without limitation, if a user inputs a breaker trip limit of 20 amps, such as may be identified at one or more of the interfaces 90, the power limit may be automatically set to 18 amps. Any predetermined amount may be utilized.

The display assembly 30 may comprise power monitoring equipment 86. Such power monitoring equipment 86 may comprise one or more actual or simulated electric meters, or the like. The power monitoring equipment 86 may be part of, or in electronic communication with, the controller 50. Such simulated electric meters may be and/or operate as shown and/or described in US Pub. No. 2019/0339312 published Nov. 7, 2019, the disclosures of which are hereby incorporated by reference, by way of non-limiting example.

The controller 50 may be configured to limit power input to, at, or below the power input limit, by way of non-limiting example. The controller 50 may be configured to monitor power consumption, such as but not limited to by way of the power monitoring equipment 86. As the power consumption approaches (e.g., is within a predetermined margin of) and/or reaches or exceeds the power input limit, the controller 50 may be configured to adjust operations of the display assembly 30, such as to adjust the power consumption to a level at, below, or within a tolerance of, the power input limit.

For example, without limitation, the controller 50 may be configured to automatically adjust operations of the display assembly 30 to reduce power draw. For example, without limitation, the electronic displays 70 may be operated at reduced to zero illumination, fan speed may be reduced, peripheral devices may be deactivated, combinations thereof, or the like. Alternatively, or additionally, the controller 50 may be configured to automatically adjust power routing, such as through different electric pathways, such as to adjust current, voltage, amperage, wattage, amp-hours, combinations thereof, or the like, disconnecting certain power supplies, disconnecting certain power consuming equipment, inactivating certain power consuming equipment, adjusting certain power consuming equipment, combinations thereof, or the like.

Figures 15, 16:
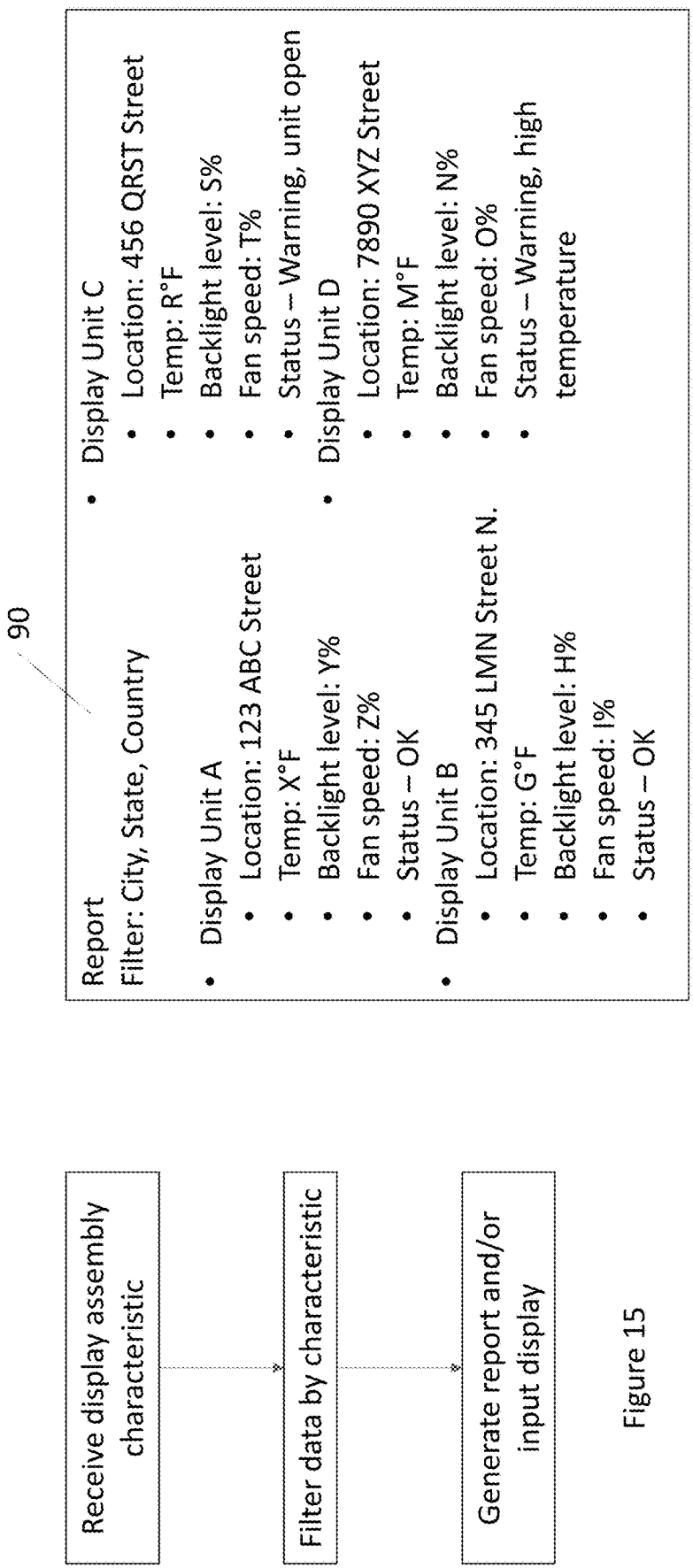
FIG. 15 is a flow chart with exemplary logic for use with the system of at least FIG. 1.
FIG. 16 is a plan view of an exemplary report generatable by at least the system of FIG. 1 and the method of FIG. 15.

FIG. 15 illustrates a flow chart for remotely monitoring and/or adjusting various data points for the display assemblies 30. Data points may include, but are not necessarily limited to, daytime brightness level, nighttime brightness level, brightness transition (e.g., from day-to-night and/or night-to-day), autonomous peripheral power cycling and under what conditions, autonomous media player reboots and under what conditions, combinations thereof, or the like.

The various data points may be remotely monitored and/or updated. The data points may be viewed and/or updated based on various display assembly 30 characteristics, including but not necessarily limited to, deployed geographic region (e.g., zip code, city, within distance from particular location, state, province, country, combinations thereof, or the like), part number, unit serial number, fleet, customer identifier, advertisement identifier, combinations thereof, or the like.

FIG. 16 illustrates an exemplary report 90 filtered by an exemplary geographic region. The type and arrangement of data is merely exemplary and is not intended to be limiting. The interfaces or report 90 may be generated with only the data points relevant to the selected characteristic(s). In this fashion, a user may not only see only the content relevant to their display assemblies 30, but this content may be further filtered by various characteristics. This may be used to only provide relevant data in reporting and/or relevant settings for adjustment.

Figure 17:
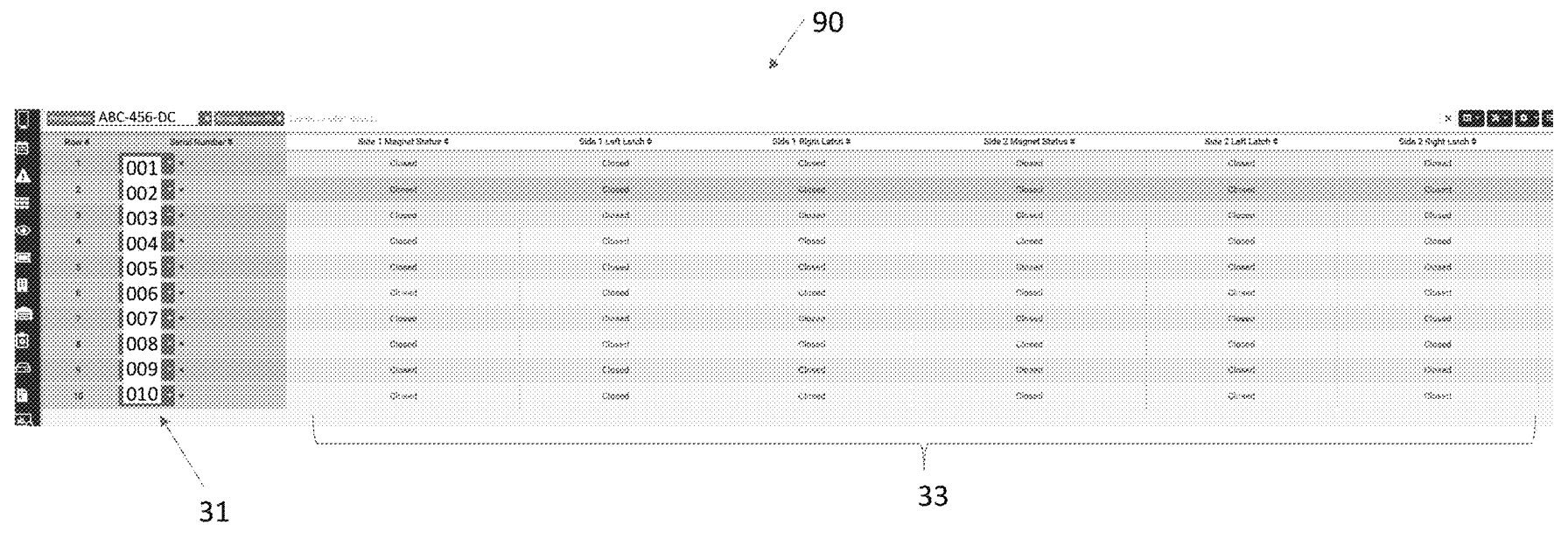

FIG. 17 illustrates an exemplary report 90 filtered by status of the latching devices 61, electronic displays 70, and/or access panels 75. Identifying information for the display assemblies 30 may be provided at item 31, and status information for the latching devices 61, electronic displays 70, and/or access panels 75 may be provided at item 33.

The type, kind, and/or arrangement of data and options shown in the interfaces or reports 90 shown and/or described herein is merely exemplary and is not intended to be limiting. Any type, kind, and/or arrangement of data and options may be provided. The data points shown and/or described may be manipulated, processed, and/or visualized in various ways.

FIG. 18 through FIG. 22 illustrate a side assembly status monitoring feature for the display assemblies 30. As used herein, the term "side assembly" may individually refer to one of the electronic displays 70, or assemblies thereof, and/or access panels 75. In the plural form, the term "side assemblies" may collectively refer to multiple electronic displays 70, multiple access panels 75, or some combination thereof.

As part of the latching devices 61, or separate therefrom, one or more proximity sensors 77 may be provided at some or all of the display assemblies 30. The proximity sensors 77 may be any type or kind of proximity sensor, including but not limited to, capacitive, doppler effect, inductive, magnetic, optical, radar, sonar, ultrasonic, fiber optical, hall effect, combinations thereof, or the like. Some or all of the proximity sensors 77, or components thereof, may be located at the side assembly, the structural subassembly 71, combinations thereof, or the like. The proximity sensors 77 may be located away from a hinging or other edge or moving portion of the side assemblies such that the side assembly is moveable a relatively far distance from the proximity sensor 77 when opened, though any location of the proximity sensor 77 may be utilized. For example, without limitation, where a side assembly hinges along an upper edge, the proximity sensor 77 may be located along a bottom edge of the side assembly and/or a corresponding portion of the structural subassembly 71. This may provide more accurate readings.

In exemplary embodiments, without limitation, the latching device 61 and the proximity sensors 77 are placed outside of a visible area of the electronic display layers 73, such as within a border frame area of a structural portion of the electronic display 70, though such is not required.

The same or different latching devices 61 and proximity sensors 77 may be used for the electronic display 70 and the access panel 75. Where more than one side assembly is provided at a given display assembly 30 multiple ones of the latching devices 61 and the proximity sensors 77 may be utilized, such as one for each side assembly.

The latching devices 61 may be configured to monitor if each side assembly is latched or unlatched. The proximity sensors 77 may be configured to monitor if each side assembly is closed or open. The latching devices 61 and proximity sensors 77 may be in electronic communication with the controllers 50 for controlling operation of the display assembly 30 based on the same. Each side assembly may be separately reported and/or controlled in exemplary embodiments, without limitation.

The controller 50 may be configured to operate the display assembly 30 normally, including normal display of images at any electronic displays 70 thereof, where the latching devices 61 and the proximity sensors 77 report that all side assemblies are closed and latched. In other exemplary embodiments, without limitation, only an indication of proper latching from the latching devices 61 must be received for the controller 50 to permit normal operations, such as by assuming that where one or more of the side assemblies is latched, it must necessarily also be closed. Alternatively, or additionally, the closed/open and latched/unlatched status may be independent determined, such as for confirmation. In exemplary embodiments, without limitation, each side assembly may be separately operated by the controller 50 such that the controller 50 may permit normal operations at any given one of the side assemblies that is indicated latched and/or closed by the latching devices 61 and/or proximity sensors 77. Normal operations may include normal display of images (e.g., FIG. 21).

Figure 18:
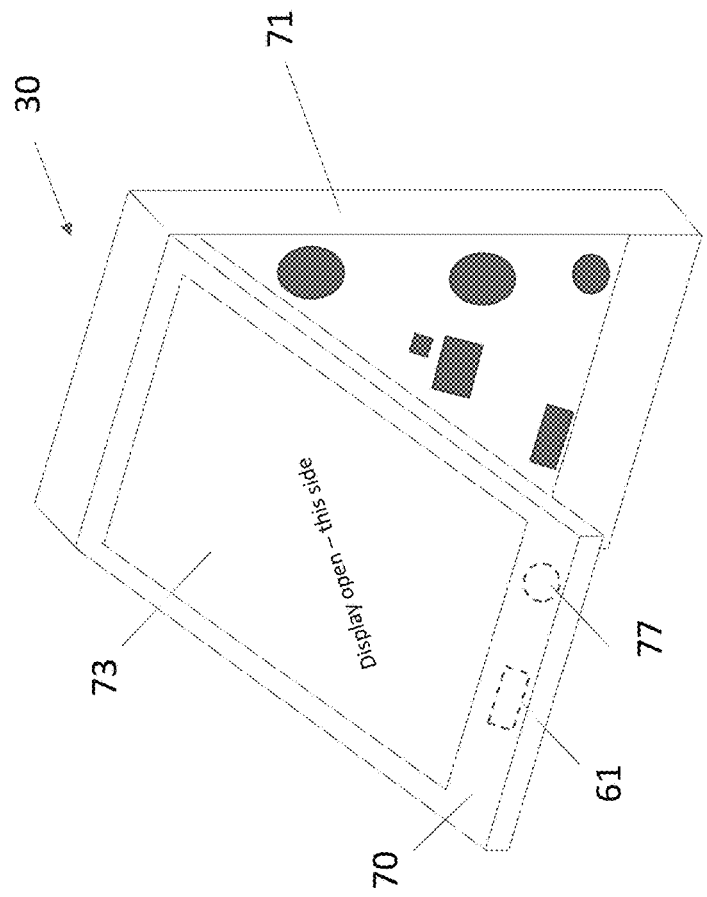
FIG. 18 is a front perspective view of another exemplary embodiment of the display assembly for use with the system of at least FIG. 1 with a side assembly in an exemplary unlatched and opened position.
Figure 21:
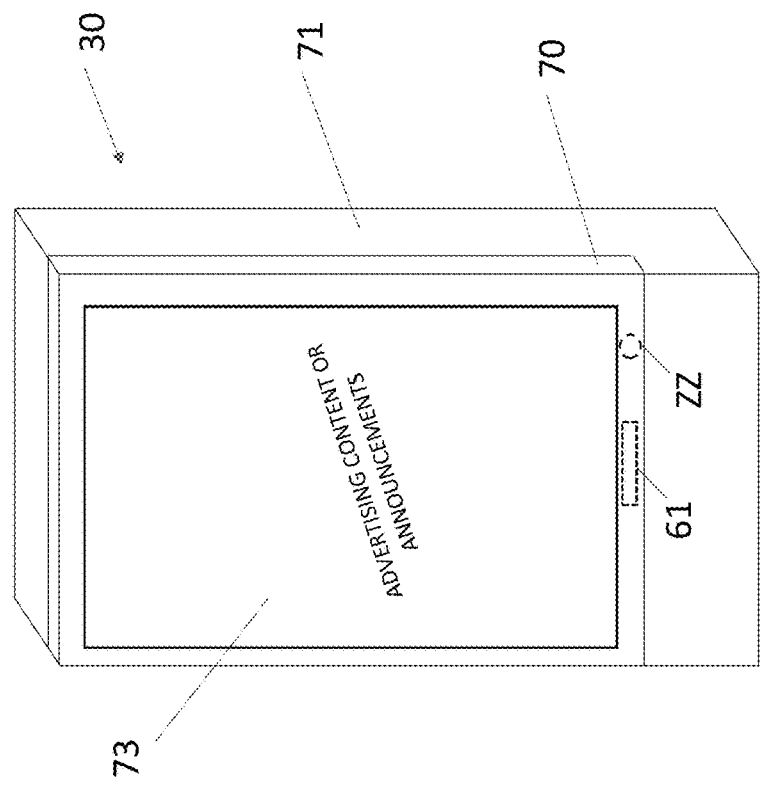
FIG. 21 is a front perspective view of the display assembly of FIG. 18 with the side assembly in an exemplary closed and latched position.
Figure 20:
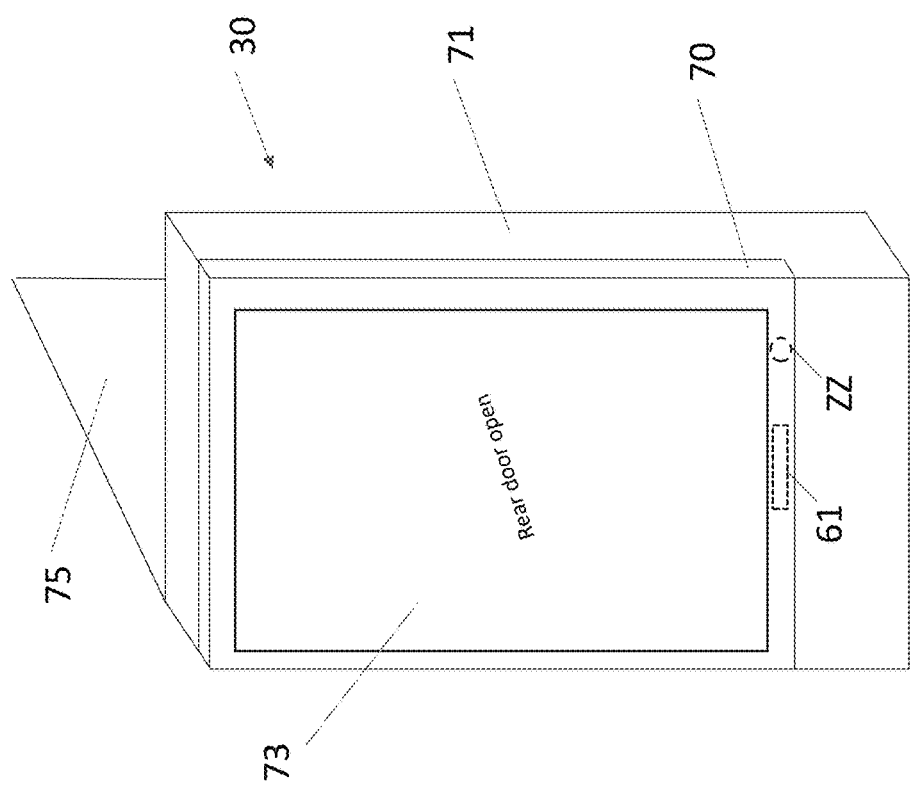
FIG. 20 is a front perspective view of the display assembly of FIG. 18 with a rear side assembly in an exemplary open position.
Figure 22:
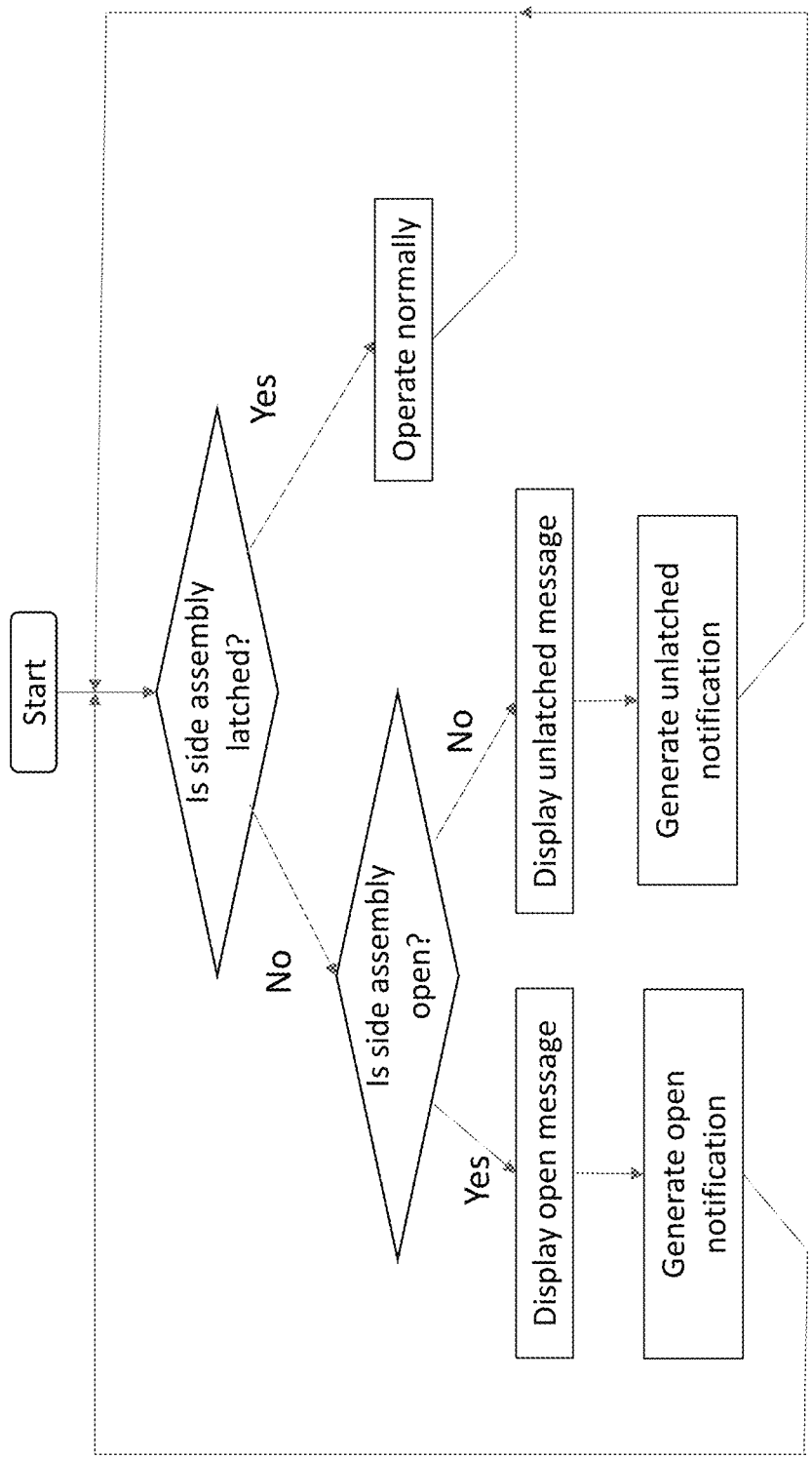
FIG. 22 is a flow chart with exemplary logic for operating the display assembly of FIGS. 18-21 and related systems.

If the latching devices 61 indicate that a given side assembly of a given display assembly 30 is unlatched and the associated proximity sensor 77 for the given side assembly indicates that given side assembly is opened, the controller 50 of the given display assembly 30 may be configured to generate an alert indicating the open status (e.g., FIGS. 18, 20). The controller 50 and/or proximity sensor 77 may be configured to determine that the side assembly is open where no detection of the side assembly within a signaling or other predetermined range of the proximity sensor 77 is detected.

Figure 19:
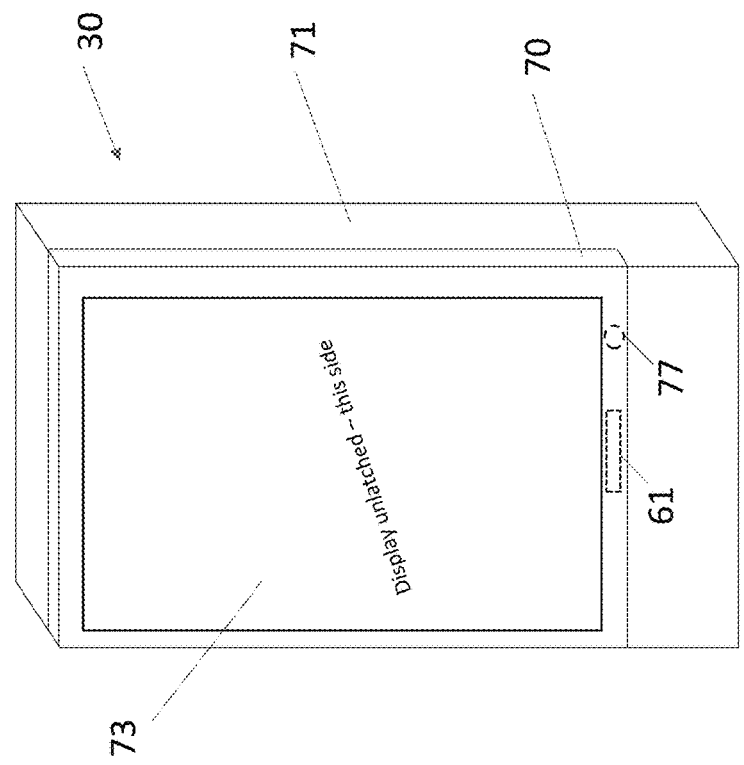
FIG. 19 is a front perspective view of the display assembly of FIG. 18 with the side assembly in an exemplary closed and unlatched position.

If the latching devices 61 indicates that a given side assembly of a given display assembly 30 is unlatched and the associated proximity sensor 77 for the given side assembly indicates that given side assembly is closed, the controller 50 of the given display assembly 30 may be configured to generate an alert indicating the unlatched status (e.g., FIG. 19). The controller 50 and/or proximity sensor 77 may be configured to determine that the side assembly is closed where detection of the side assembly within the signaling or other predetermined range of the proximity sensor 77 is detected. The controller 50 and/or latching device 61 may be configured to determine that the side assembly is unlatched where signals from a switch indicate a latch in an unsecured position.

The alerts may be provided in place of normal electronic display 70 content. For example, without limitation, normal images may be removed and the electronic display 70 may be operated with blank (e.g., black image, white image) or certain static content (e.g., default image). This may permit the alert(s) to be quickly noticed. Alternatively, or additionally, the alerts may be provided in addition to normal electronic display 70 content, such as in a pop-up message.

The alerts may indicate the side assembly status (e.g., open and/or unlatched) and, optionally, a name or description of the side assembly (e.g., left or right, front or back, display or door, etc.).

Preferably, the alerts are displayed at the given side assembly itself, such as where the given side assembly comprises the electronic display 70 (e.g., FIGS. 18-19). However, the alerts may be displayed at other side assemblies or electronic displays, such as where the given side assembly is an access panel 75 without necessarily having an electronic display (e.g., FIG. 20). Alerts may be displayed only at the affected side assembly where the affected side assembly include an electronic display 70 and/or electronic display layer 73, though such is not required. Alerts may optionally be displayed at multiple side assemblies or other locations. The controller 50 may, alternatively or additionally, transmit status information from, or derived from, the latching devices 61 and/or proximity sensors 77 and/or the alerts to one or more remote devices, such as the monitoring center 20 and/or client devices 10.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections described herein may be accomplished by wired or wireless means. The electronic devices, including but not necessarily limited to the electronic storage devices, databases, or the like, may comprise and/or be configured to hold, solely non-transitory signals.

What is claimed is:

1. A digital signage unit which alerts a user or users to unsecured conditions, said digital signage unit comprising:
 a structural subassembly;
 a side assembly comprising an electronic display and a housing for the electronic display, wherein said side assembly is movably attached to said structural subassembly;
 a securing device moveable between a secured configuration for securing the side assembly, and the electronic display therewith, to the structural subassembly and an unsecured configuration allowing movement of at least a portion of the side assembly, and the electronic display therewith, away from the structural subassembly;
 a first sensor configured to detect if said securing device is in the secured configuration;
 a second sensor configured to detect if said side assembly is a first, closed position; and
 a controller in electronic communication with said device, said electronic display, said first sensor, and said second sensor, wherein said controller is configured to:
 receive data from said first sensor and said second sensor;
 where the data received from the first sensor indicates that said securing device is in the secured configuration and the data received from the second sensor indicates that the side assembly is in the closed position, permit said electronic display to undertake normal operations, including causing advertising images to be displayed at said electronic display; and at each discrete instance where the data received from the first sensor indicates that said securing device is not in the secured configuration and/or the data received from the second sensor indicates that the side assembly is not in the closed position, generate an alert.

2. The digital signage unit of claim 1 wherein:
the alert comprises text indicating that the side assembly is not secured.

3. The digital signage unit of claim 2 wherein:
the controller is configured to cause the electronic display to display the alert at the electronic display and continue to display the alert at the electronic display at least until data is received from the first sensor indicating that said securing device is in the secured configuration and data is received from the second sensor indicating that said side assembly is in the closed position.

4. The digital signage unit of claim 1 wherein:
the alert comprises one of various candidate alerts comprising a side assembly open alert and a side assembly unsecured alert; and
the controller is configured to:
  generate the side assembly open alert where the second sensor indicates that the side assembly is not in the closed position; and
  generate the side assembly unsecured alert where the first sensor indicates that the securing device is not in the secured configuration.

5. The digital signage unit of claim 4 wherein:
the controller is configured to display the side assembly unsecured alert at the electronic display and continue to display the side assembly unsecured alert at the electronic display at least so long as the first sensor indicates that the securing device is not in the secured configuration.

6. The digital signage unit of claim 1 wherein:
said securing device comprises a latching device.

7. The digital signage unit of claim 6 wherein:
the latching device comprises a first subcomponent located at, and forming part of the side assembly and a second subcomponent located at the structural subassembly which are configured to selectively engage one another; and
the first sensor comprises a switch engageable with at least one of the first subcomponent and the second subcomponent such that the switch changes state when the first subcomponent and the second subcomponent are moved out of engagement with one another.

8. The digital signage unit of claim 1 wherein:
the second sensor comprises a switch positioned between a portion of the structural subassembly and a portion of the side assembly such that the switch changes state when the side assembly is moved out of the closed position.

9. The digital signage unit of claim 8 wherein:
the side assembly is mounted to said structural subassembly by way of one or more hinges such that the portion of the side assembly is rotatable away from said structural subassembly; and
said switch is located between said structural subassembly and the portion of the side assembly.

10. The digital signage unit of claim 1 wherein:
the closed position includes placement of the electronic display proximate to the structural subassembly such that the electronic display extends at least primarily in a vertical direction; and
the second sensor comprises a proximity sensor positioned to detect if a portion of the electronic display or the housing is proximate to the structural subassembly.

11. The digital signage unit of claim 10 wherein:
the proximity sensor comprises a magnet located at the portion of the side assembly and a magnetic field detector located at a corresponding portion of the structural subassembly.

12. The digital signage unit of claim 1 further comprising:
a network communication device in electronic communication with the controller and one or more remote electronic devices by way of at least one network, wherein said controller is configured to transmit the generated alert message to at least one of the one or more remote electronic devices.

13. The digital signage unit of claim 1 wherein:
the electronic display comprises a liquid crystal layer and a backlight for the liquid crystal layer.

14. The digital signage unit of claim 1 wherein:
the structural subassembly is configured for mounting to a ground surface.

15. A digital signage unit which alerts a user or users to unsecured conditions, said digital signage unit comprising:
a structural framework;
a side assembly comprising an electronic display comprising a liquid crystal format display and a housing for the electronic display, wherein said side assembly moveably attached to said structural framework in a manner which permits movement between a closed position where the side assembly, including the electronic display, is proximate to the structural framework and an opened position where at least a portion of the side assembly, including the electronic display, is moved to a position spaced apart from the structural framework;
a securing device configured for movement between a secured configuration securing the side assembly, including the electronic display, to said structural framework and an unsecured configuration allowing movement of the side assembly, including the electronic display, into the opened position;
one or more sensors configured to detect if said digital signage unit is secured such that the side assembly is in the closed position and the securing device is in the secured configuration or not;
a controller in electronic communication with said securing device, said electronic display, said sensors, wherein said controller is configured to:
  receive data from said one or more sensors;
  where the data received from the one or more sensors indicates that said digital signage unit is secured, permit said electronic display to undertake normal operations, including causing advertising images to be displayed at said electronic display; and
  at each discrete instance where the data received from any of the one or more sensors indicates that said digital signage unit is not secured, generate an alert message.

16. The digital signage unit of claim 15 wherein:
the one or more sensors comprises a plurality of sensors; and
the controller is configured to select the alert message from a plurality of candidate alert messages based on which of the plurality of sensors indicate that the digital signage unit is not secured.

17. The digital signage unit of claim 16 wherein:
the plurality of sensors comprises a first sensor configured to detect if the side assembly is in the closed position or not and a second sensor configured to detect if the securing device is in the secured configuration or not;
the plurality of candidate alert messages comprises an open display alert message, an unlatched display alert message, and an open and unlatched alert message;
the controller is configured to generate the open display alert message where the first sensor detects that the side assembly is not in the closed position; and
the controller is configured to generate the unlatched display alert message where the second sensor detects that the securing device is not in the secured configuration; and
the controller is configured to generate the open and unlatched alert message where the first sensor detects that the side assembly is not in the closed position and the second sensor detects that the securing device is not in the secured configuration.

18. The digital signage unit of claim 17 wherein:
the controller is configured to display the generated alert at the electronic display.

19. The digital signage unit of claim 17 wherein:
the controller is configured to transmit the generated alert to one or more remote electronic devices.

20. A display signage unit which alerts a local viewer or viewers to unsecured conditions, said digital signage unit comprising:
a structural framework for mounting to a surface or a vehicle;
a side assembly movably attached to said structural framework in a hinged manner such that a bottom portion of the side assembly is moveable between a closed position where the bottom portion of the side assembly is adjacent to the structural framework and the side assembly extends along the structural framework and an opened position where the bottom portion of the side assembly is rotated away from the structural framework, said side assembly comprising a housing, a cover, and a directly backlit liquid crystal type electronic display layer situated within the housing and behind the cover such that a longitudinal axis of the electronic display layer extends in a vertical direction when the side assembly is placed in the closed position;
a latch for selectively latching said side assembly to said structural subassembly when the side assembly is in the closed position;
sensors configured to, collectively, detect if said digital signage unit is in a secured configuration or not, where said secured configuration includes the side assembly being in the closed position and the latch being in a latched position;
a controller in electronic communication with said latch, said side assembly, said sensors, wherein said controller is configured to:
receive data from said sensors;
where the data received from the sensors indicates that said side assembly is in the secured configuration, permit said side assembly to undertake normal operations, including display of advertising images at the electronic display layer; and
at each discrete instance where the data received from any of the sensors indicates that said digital signage unit is not in the secured configuration:
determine which of the sensors indicates that said digital signage unit is not in the secured configuration;
select one of various alert messages based on which of the sensors indicates that said digital signage unit is not in the secured configuration; and
cause said electronic display to display the selected alert message.

* * * * *